United States Patent
Yoda

(10) Patent No.: US 10,909,376 B2
(45) Date of Patent: Feb. 2, 2021

(54) INFORMATION PROCESSING APPARATUS, INFORMATION PROCESSING SYSTEM, AND NON-TRANSITORY COMPUTER READABLE MEDIUM STORING PROGRAM

(71) Applicant: FUJI XEROX CO., LTD., Tokyo (JP)

(72) Inventor: Akira Yoda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/518,960

(22) Filed: Jul. 22, 2019

(65) Prior Publication Data

US 2020/0302172 A1 Sep. 24, 2020

(30) Foreign Application Priority Data

Mar. 18, 2019 (JP) .................................. 2019-049709

(51) Int. Cl.
G06K 9/00 (2006.01)
G06F 3/14 (2006.01)
H04N 1/00 (2006.01)

(52) U.S. Cl.
CPC ........... *G06K 9/00671* (2013.01); *G06F 3/14* (2013.01); *H04N 1/00251* (2013.01); *H04N 1/00405* (2013.01); *H04N 1/00493* (2013.01); *H04N 2201/0094* (2013.01)

(58) Field of Classification Search
CPC .. G06K 9/00671; G06F 3/14; H04N 1/00405; H04N 1/00493; H04N 1/00251; H04N 2201/0094
See application file for complete search history.

(56) References Cited

U.S. PATENT DOCUMENTS

| | | | | |
|---|---|---|---|---|
| 7,362,456 | B2 * | 4/2008 | Wanda | H04N 1/32529 358/1.14 |
| 7,855,794 | B2 * | 12/2010 | Kikuchi | G06F 3/121 358/1.14 |
| 9,307,101 | B2 | 4/2016 | Oda | |
| 9,766,847 | B1 * | 9/2017 | Alacar | G06F 3/121 |
| 10,281,976 | B2 * | 5/2019 | Nishizawa | G06F 3/013 |
| 10,715,489 | B2 * | 7/2020 | Uchida | H04L 41/0816 |
| 2002/0085046 | A1 * | 7/2002 | Furuta | G06T 15/20 715/848 |

(Continued)

FOREIGN PATENT DOCUMENTS

| | | |
|---|---|---|
| JP | 2012156872 | 8/2012 |
| JP | 5682815 | 3/2015 |

OTHER PUBLICATIONS

RD 553061, May 2010, USA, Siong et al.*

*Primary Examiner* — Martin Mushambo
(74) *Attorney, Agent, or Firm* — JCIPRNET

(57) ABSTRACT

An information processing apparatus includes a capturing section, a recognition section that recognizes that a target object is represented in a captured image captured by the capturing section, and a control section that displays a first image obtained by adding an image based on target object information related to the target object to the captured image on a display section in a case where the recognition section recognizes the target object, and displays a second image which is different from the first image and includes the image based on the target object information on the display section in a case where the recognition section does not recognize the target object.

12 Claims, 13 Drawing Sheets

(56) References Cited

U.S. PATENT DOCUMENTS

| | | | |
|---|---|---|---|
| 2003/0076524 A1* | 4/2003 | Wanda | G06F 3/1205 358/1.14 |
| 2004/0021903 A1* | 2/2004 | Wanda | H04N 1/32529 358/1.15 |
| 2004/0201578 A1* | 10/2004 | Sadahiro | G06F 3/0488 345/173 |
| 2006/0087676 A1* | 4/2006 | Hotokeishi | G06F 3/1206 358/1.15 |
| 2007/0103725 A1* | 5/2007 | Kawahara | G06Q 10/06 358/1.15 |
| 2008/0068649 A1* | 3/2008 | Emori | G06F 3/1226 358/1.15 |
| 2008/0240573 A1* | 10/2008 | Nakamura | G01C 21/26 382/190 |
| 2008/0273757 A1* | 11/2008 | Nakamura | G01C 21/26 382/104 |
| 2009/0273808 A1* | 11/2009 | Kohli | G06F 3/1226 358/1.15 |
| 2011/0157623 A1* | 6/2011 | Nakayama | G06F 3/04817 358/1.15 |
| 2011/0187772 A1* | 8/2011 | Tomoguchi | B41J 2/17546 347/7 |
| 2011/0286012 A1* | 11/2011 | De Munck | G06F 3/1284 358/1.6 |
| 2011/0304879 A1* | 12/2011 | Kakutani | H04N 1/00875 358/1.15 |
| 2011/0310428 A1* | 12/2011 | Ciriza | G06F 3/1285 358/1.15 |
| 2012/0062924 A1* | 3/2012 | Fukushima | G06F 16/93 358/1.13 |
| 2012/0194859 A1* | 8/2012 | Oda | H04N 1/00344 358/1.15 |
| 2012/0259973 A1* | 10/2012 | Windell | H04L 41/0686 709/224 |
| 2012/0308202 A1* | 12/2012 | Murata | H04N 21/4316 386/241 |
| 2012/0327459 A1* | 12/2012 | Huster | G06F 3/1221 358/1.15 |
| 2013/0016910 A1* | 1/2013 | Murata | H04N 21/8583 382/195 |
| 2013/0069985 A1* | 3/2013 | Wong | G06F 1/163 345/633 |
| 2013/0108345 A1* | 5/2013 | Yamamoto | G03G 15/5087 400/76 |
| 2013/0169996 A1* | 7/2013 | McLeod | G06F 3/1204 358/3.28 |
| 2014/0063152 A1* | 3/2014 | Ito | B41J 2/17596 347/86 |
| 2014/0211255 A1* | 7/2014 | Takasu | G06Q 20/20 358/1.15 |
| 2014/0368859 A1* | 12/2014 | Gutnik | G06F 3/1206 358/1.14 |
| 2014/0368865 A1* | 12/2014 | Gutnik | G06F 3/1267 358/1.15 |
| 2014/0376035 A1* | 12/2014 | Niimura | G06F 3/123 358/1.15 |
| 2015/0350468 A1* | 12/2015 | Kodimer | H04N 1/00413 358/1.13 |
| 2015/0378654 A1* | 12/2015 | Asai | G06F 3/1236 358/1.15 |
| 2016/0019007 A1* | 1/2016 | Kurihara | H04N 1/00214 358/1.15 |
| 2016/0042602 A1* | 2/2016 | Phan | G07F 17/3237 463/29 |
| 2016/0085485 A1* | 3/2016 | Katayama | G06F 3/1208 358/3.27 |
| 2016/0364615 A1* | 12/2016 | Sakoda | H04N 1/00244 |
| 2017/0017859 A1* | 1/2017 | Uchiyama | G06K 9/6292 |
| 2017/0076428 A1* | 3/2017 | Ishikawa | G06K 9/00671 |
| 2017/0076497 A1* | 3/2017 | Inomata | G06F 3/0346 |
| 2017/0118374 A1* | 4/2017 | Tsujiguchi | G06F 21/84 |
| 2017/0123741 A1* | 5/2017 | Duran, Jr. | G06F 3/1204 |
| 2017/0124765 A1* | 5/2017 | Imamura | G06T 19/006 |
| 2017/0127278 A1* | 5/2017 | Yamamoto | H04W 12/06 |
| 2017/0147890 A1* | 5/2017 | Sano | G06K 9/00805 |
| 2017/0160550 A1* | 6/2017 | Kobayashi | G02B 27/017 |
| 2017/0322691 A1* | 11/2017 | Tokuchi | H04N 1/00307 |
| 2017/0359482 A1* | 12/2017 | Sasaki | H04N 1/32539 |
| 2018/0032020 A1* | 2/2018 | Shintani | G03G 15/70 |
| 2018/0032793 A1* | 2/2018 | Han | G06T 7/73 |
| 2018/0107876 A1* | 4/2018 | Lee | G06T 11/00 |
| 2018/0150967 A1* | 5/2018 | Averianov | H04N 5/23293 |
| 2018/0165857 A1* | 6/2018 | Lee | G06F 3/013 |
| 2018/0189685 A1* | 7/2018 | Oesterling | G06K 9/2063 |
| 2018/0285642 A1* | 10/2018 | Nishimura | G01J 3/2823 |
| 2019/0049724 A1* | 2/2019 | Kimura | G06K 9/00671 |

* cited by examiner

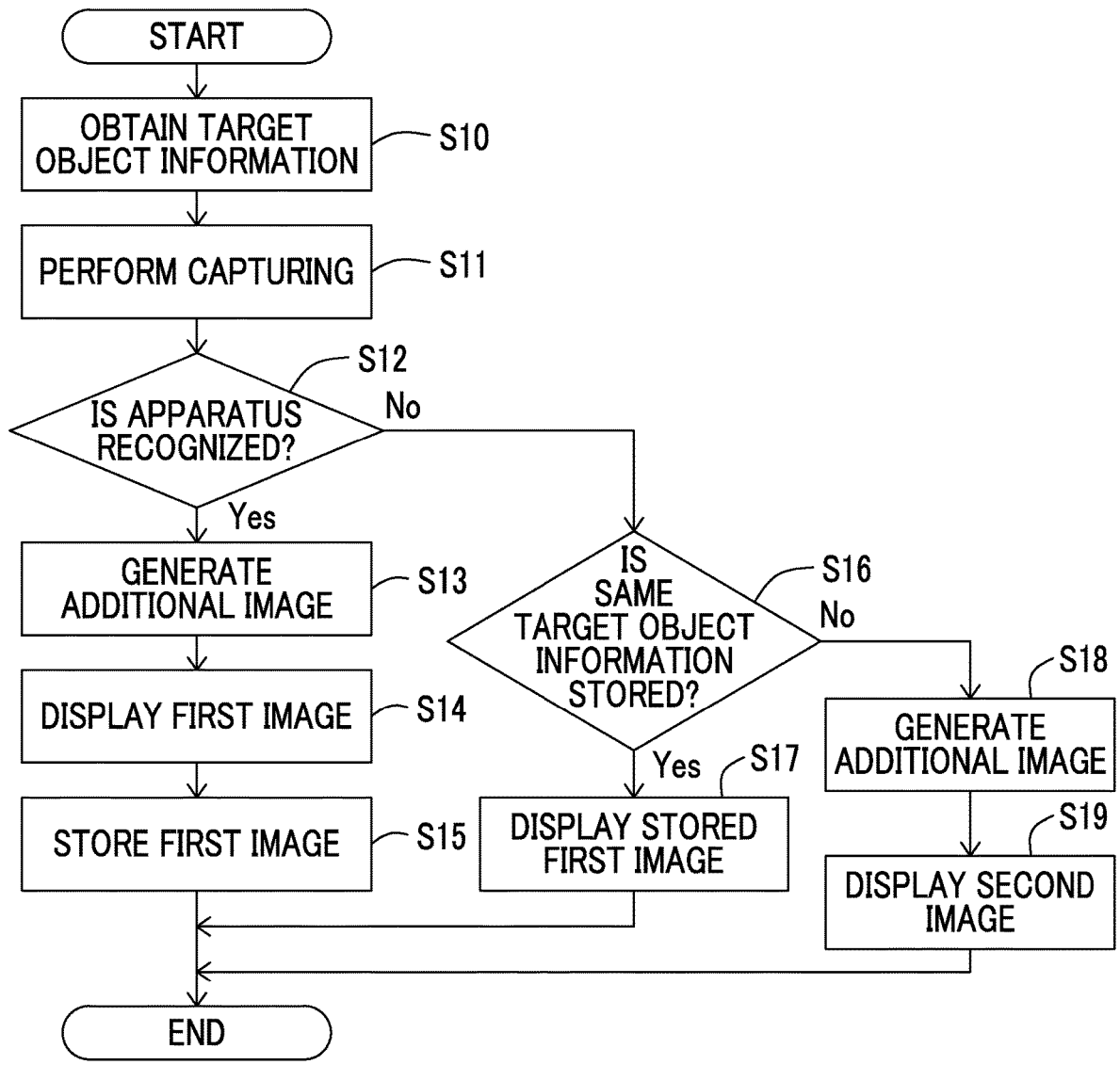

INFORMATION PROCESSING APPARATUS, INFORMATION PROCESSING SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-049709 filed Mar. 18, 2019.

BACKGROUND

(i) Technical Field

The present invention relates to an information processing apparatus, an information processing system, and a non-transitory computer readable medium storing a program.

(ii) Related Art

In a case where a target object such as an apparatus is captured and the target object is recognized from a captured image, the captured image may be displayed, and an image based on information related to the target object may be additionally displayed in the captured image. For example, such a display may be performed using augmented reality (AR) technology.

JP2012-156872A discloses an information processing apparatus that determines a captured part based on a captured image of an image forming apparatus, transmits first display information corresponding to the captured part to a portable terminal in a case where a designated part in which a notifiable event occurs is included in the captured part, and transmits guidance information leading to the designated part to the portable terminal in a case where the designated part is not included in the captured part.

SUMMARY

In the technology in which the image based on the information related to the target object is additionally displayed in the captured image in a case where the target object is recognized from the captured image, the image based on the information related to the target object is not displayed in a case where the target object is not recognized from the captured image. The user may not check the information related to the target object.

Aspects of non-limiting embodiments of the present disclosure relate to an information processing apparatus, an information processing system, and a non-transitory computer readable medium storing a program in which in a case where an image based on information related to a target object is displayed in the case of recognizing the target object from a captured image, a user may check the information related to the target object even in a case where the target object is not recognized from the captured image.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a capturing section, a recognition section that recognizes that a target object is represented in a captured image captured by the capturing section, and a control section that displays a first image obtained by adding an image based on target object information related to the target object to the captured image on a display section in a case where the recognition section recognizes the target object, and displays a second image which is different from the first image and includes the image based on the target object information on the display section in a case where the recognition section does not recognize the target object.

BRIEF DESCRIPTION OF THE DRAWINGS

Exemplary embodiment(s) of the present invention will be described in detail based on the following figures, wherein:

FIG. 11 is a flowchart illustrating a process according to Modification Example 1;

FIG. 12 is a diagram illustrating a display condition of the first image or the second image;

DETAILED DESCRIPTION

Figure 1:
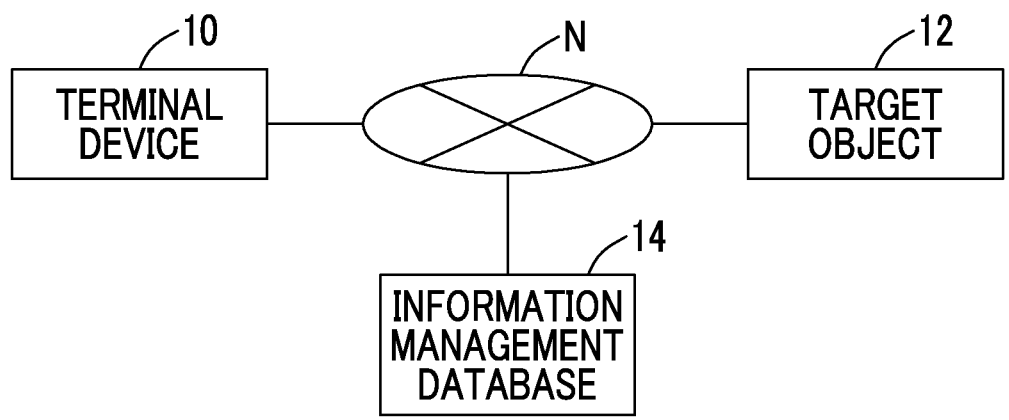
FIG. 1 is a block diagram illustrating a configuration of an information processing system according to the present exemplary embodiment.

Hereinafter, an information processing system according to an exemplary embodiment of the present invention will be described with reference to FIG. 1. FIG. 1 illustrates one example of a configuration of the information processing system according to the present exemplary embodiment.

The information processing system according to the present exemplary embodiment includes a terminal device 10 as one example of an information processing apparatus. The terminal device 10 is a device such as a personal computer (hereinafter, referred to as the "PC"), a tablet PC, a smartphone, or a mobile phone. For example, the terminal device 10 is a portable terminal device such as a tablet PC, a smartphone, or a mobile phone.

A target object 12 is an object of a target for obtaining information. As will be described below, the target object 12 is captured by the terminal device 10. The target object 12 may be any object that may be captured by the terminal device 10. For example, the target object 12 is a tangible object physically occupying a part of space. Specifically, the target object 12 is an apparatus, furniture, an automobile, a building, or the like. The target object 12 may be other objects. For example, the apparatus is an object referred to as an electronic apparatus, an information apparatus, a video apparatus, an audio apparatus, or a home appliance. For example, an apparatus processing information or an apparatus having a communication function corresponds to one example of the target object 12. In addition, the target object 12 may be an apparatus that may transmit and receive information with the terminal device 10 by communication. For example, the furniture is a chair, a table, or a sofa. For example, the building is a house or a store. In addition, the target object 12 may be an image displayed on a display device, a text or a figure described on paper or the like, a three-dimensional image drawn in a space, or the like.

In the example illustrated in FIG. 1, the terminal device 10 and the target object 12 are connected to a communication path N and may communicate with other apparatuses. The terminal device 10 and the target object 12 may not be connected to the communication path N. Plural target objects 12 may be connected to the communication path N. For example, the communication path N is a network such as a local area network (LAN) or the Internet. The communication path N may be implemented by wired communication or may be implemented by wireless communication such as Wi-Fi (registered trademark). In addition, the terminal device 10 and the target object 12 may directly communicate with other apparatuses by short-range wireless communication or the like without passing through the communication path N. For example, Bluetooth (registered trademark), RFID, or NFC is used as the short-range wireless communication.

An information management database 14 is an apparatus managing target object information of each target object 12. The terminal device 10 may obtain the target object information from the information management database 14 through the communication path N or by the short-range wireless communication or the like. The information management database 14 may be disposed in the target object 12, and the terminal device 10 may obtain the target object information from the target object 12. In addition, the information management database 14 may not be used. In this case, the terminal device 10 may obtain the target object information from an external apparatus such as a server other than the information management database 14. In addition, the whole or a part of the target object information may be stored in the terminal device 10.

The target object information is information related to the target object 12. The target object information may be information that changes depending on the state of the target object 12, or may be information that does not change depending on the state of the target object 12.

For example, the state of the target object 12 may be the state of the exterior of the target object 12, the state of the interior (that is, the state not seen from the outside) of the target object 12, or the state of both of the exterior and the interior. The information which changes depending on the state of the target object 12 is information that changes depending on the state of the exterior or the interior. For example, the state of the exterior of the apparatus as the target object 12 corresponds to whether a cover disposed in the apparatus is open or closed. The target object information changes depending on whether the cover is open or closed. The state of the interior of the apparatus corresponds to whether or not an error occurring in the apparatus is present. The target object information changes depending on whether or not the error is present. The change in state of the target object 12 may be obtained by an operation performed by a user capturing the target object 12. For example, the cover may be open or closed by the user.

For example, the information which does not change depending on the state of the target object 12 is unique information associated with the target object 12. For example, identification information for identifying the target object 12 or installation location information indicating a location where the target object 12 is installed corresponds to one example of the unique information. For example, the identification information is a name, an ID, an IP address, or a MAC address of the target object 12. The installation location information includes information indicating a floor on which the target object 12 is installed, information indicating a position at which the target object 12 is installed on the floor, information indicating an address at which the target object 12 is installed, coordinate information obtained by a global positioning system (GPS), and the like.

For example, the target object information includes the identification information, the installation location information, type information indicating the type of target object 12, state information indicating the state of the target object 12, and configuration information indicating the configuration of the target object 12. A part of the installation location information, the type information, the state information, and the configuration information may be included in the target object information. In addition, depending on the target object 12, information indicating a content of a service provided by the target object 12, information indicating the price of the target object 12, and the like may be included in the target object information.

Figure 2:
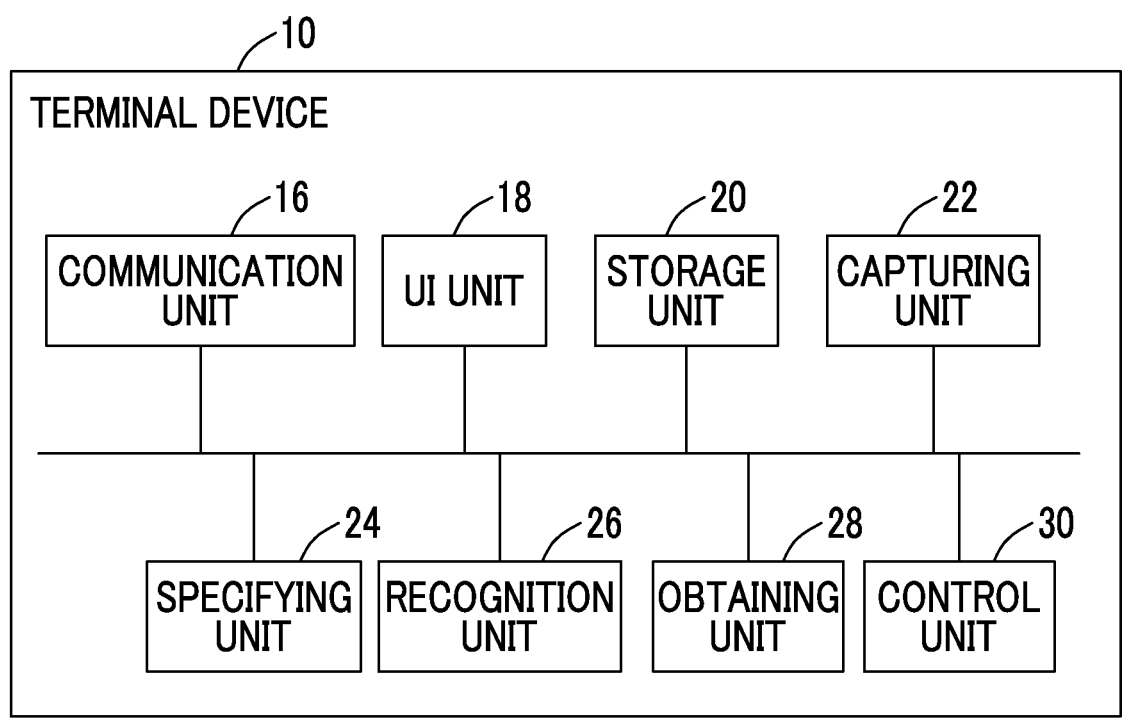
FIG. 2 is a block diagram illustrating a configuration of a terminal device according to the present exemplary embodiment.

Hereinafter, a configuration of the terminal device 10 will be described in detail with reference to FIG. 2. FIG. 2 illustrates one example of the configuration of the terminal device 10.

A communication unit 16 is a communication interface and has a function of transmitting information to other apparatuses and a function of receiving information from other apparatuses. The communication unit 16 may have either a wireless communication function or a wired communication function.

A UI unit 18 is a user interface unit and includes a display unit and an operation unit. The display unit is a display device such as a liquid crystal display. The operation unit is an input device such as a keyboard or a mouse. The UI unit 18 may be a touch panel that doubles as the display unit and the operation unit. In addition, the UI unit 18 may include a voice output unit such as a speaker.

A storage unit 20 is one or plural storage areas storing information. For example, each storage area is composed of one or plural storage devices (for example, physical drives such as a hard disk drive and a memory) disposed in the terminal device 10.

A capturing unit 22 is a capturing device such as a camera and is configured to generate captured image data by performing capturing. The captured image data may be either still image data or moving image data.

A specifying unit 24 is configured to specify the target object 12 of the target for obtaining the target object information. The specifying unit 24 may specify the target object 12 recognized by a recognition unit 26, described below, as the target object 12 of the target for obtaining the target object information or may specify the target object 12 designated by the user as the target object 12 of the target for obtaining the target object information. For example, a list of the identification information of the target objects 12 may be displayed on the display unit of the UI unit 18, and the user may designate the target object 12 of the target for obtaining the target object information from the list. In addition, in a case where the user inputs the identification information of the target object 12 using the UI unit 18, the specifying unit 24 may specify the target object 12 having the identification information as the target object 12 of the target for obtaining the target object information. The specifying unit 24 outputs the identification information of the target object 12 of the target for obtaining the target object information to an obtaining unit 28 described below. For example, in a case where the target object 12 is recognized by the recognition unit 26, the identification information of the target object 12 is obtained, and the specifying unit 24 outputs the identification information to the obtaining unit 28. In addition, in a case where the user designates the target object 12, the specifying unit 24 outputs the identification information of the target object 12 designated by the user to the obtaining unit 28. In a case where the user inputs the identification information, the specifying unit 24 outputs the identification information input by the user to the obtaining unit 28.

The recognition unit 26 is configured to recognize the target object 12 represented by the captured image data generated by the capturing of the capturing unit 22. The recognition unit 26 recognizes the target object 12 using the captured image data currently being captured by the capturing unit 22. For example, the captured image data used in the recognition of the target object 12 is moving image data. The recognition unit 26 obtains the identification information of the target object 12 by recognizing the target object 12.

For example, the recognition unit 26 recognizes the target object 12 using a well-known image recognition technology. For example, a markerless recognition technology or a marker recognition technology is used as the image recognition technology.

For example, the markerless recognition technology is a technology for recognizing the target object 12 by matching image data. For example, image data representing the whole, a part, or a feature part of the target object 12 is stored in the terminal device 10 or the external apparatus or the like such as a server in association with the identification information of the target object 12. By matching the captured image data currently being captured by the capturing unit 22 with the image data stored in the terminal device 10 or the external apparatus or the like, the recognition unit 26 recognizes the target object 12 represented by the captured image data and obtains the identification information associated with the image data. The recognition unit 26 may perform the matching using a feature extracted from the captured image data.

The marker recognition technology is a technology for recognizing the target object 12 using a market disposed in advance in the target object 12. The marker is a member that enables the identification information of the target object 12 to be read. For example, the marker may be a member representing information (for example, a barcode or a two-dimensional code) in which the identification information is coded, or may be a member representing the non-coded identification information. In a case where the marker is captured by the capturing unit 22, the recognition unit 26 recognizes the target object 12 by obtaining the identification from image data representing the marker. For example, in a case where a two-dimensional code is captured by the capturing unit 22, the recognition unit 26 obtains the identification information by decoding the two-dimensional code and recognizes the target object 12.

The obtaining unit 28 is configured to obtain the target object information of the target object 12 specified by the specifying unit 24. Specifically, the obtaining unit 28 obtains the target object information including the identification information which is output to the obtaining unit 28 from the specifying unit 24. The obtaining unit 28 may obtain the target object information from the information management database 14, the target object 12, or the external apparatus such as a server. In a case where the whole or a part of the target object information is stored in the storage unit 20, the obtaining unit 28 may obtain the whole or the part of the target object information from the storage unit 20. The obtaining unit 28 may recognize a change in exterior of the target object 12 based on the captured image data and obtain the state information indicating the change from the captured image data. For example, in a case where the target object 12 does not have a communication function, the obtaining unit 28 may obtain the state information from the captured image data.

A control unit 30 is configured to control the operation of each unit of the terminal device 10. For example, the control unit 30 displays various information on the display unit of the UI unit 18.

For example, the control unit 30 displays a captured image based on the captured image data currently being captured by the capturing unit 22 on the display unit of the UI unit 18. In a case where the capturing unit 22 captures the captured image data as moving image data, the control unit 30 displays a moving image based on the moving image data on the display unit of the UI unit 18 each time the moving image data is generated by capturing.

The control unit 30 may display various information on the display unit of the UI unit 18 using augmented reality (AR) technology.

For example, in a case where the recognition unit 26 recognizes the target object 12, the control unit 30 displays a first image based on first image data on the display unit of the UI unit 18. In a case where the recognition unit 26 does not recognize the target object 12, the control unit 30 displays a second image based on second image data on the display unit of the UI unit 18.

The first image data is image data obtained by adding image data based on the target object information obtained by the obtaining unit 28 to the captured image data currently being captured by the capturing unit 22.

The second image data is image data that is different from the first image data and includes image data based on the target object information. For example, the second image data is image data obtained by adding the image data based on the target object information to image data that is different from the captured image data currently being captured by the capturing unit 22 and represents the target object 12.

Hereinafter, the image data based on the target object information will be referred to as "additional image data". In addition, the image data which is different from the captured image data currently being captured by the capturing unit 22 and represents the target object 12 will be referred to as "alternative image data".

For example, the alternative image data may be image data schematically representing the target object 12, image data on which a unique configuration of the target object 12 is reflected, or general-purpose image data on which the unique configuration of the target object 12 is not reflected. In addition, the alternative image data may be two-dimensional image data or three-dimensional image data. For example, the alternative image data is generated in advance for each target object 12 and is stored in the storage unit 20, the information management database 14, or the external apparatus in association with the identification information of the target object 12. In addition, the alternative image data may be generated in advance for each type of target object 12 and stored in the storage unit 20, the information management database 14, or the external apparatus in association with the type information of the target object 12. In addition, in a case where the captured image data is stored in association with the identification information of the target object 12, the alternative image data of the target object 12 may be the captured image data stored in the storage unit 20. In addition, in a case where the first image data is stored in the storage unit 20, the second image data may be the first image data stored in the storage unit 20.

In a case where the recognition unit 26 does not recognize the target object 12 anymore after the recognition unit 26 recognizes the target object 12, the control unit 30 may display the second image based on the second image data of the target object 12 on the display unit of the UI unit 18.

For example, the additional image data includes image data representing the whole or a part of information included in the target object information and image data generated by processing the target object information. For example, the control unit 30 generates the additional image data based on the target object information.

The additional image data may be image data representing the identification information included in the target object information, image data representing the state information included in the target object information, or image data representing the configuration information included in the target object information. Specifically, image data representing a message indicating the error occurring in the target object 12 as the apparatus, image data representing a method for resolving the error, image data representing the name of the target object 12, image data representing the price of the target object 12, and the like correspond to one example of the additional image data. The additional image data may also be image data representing other information included in the target object information.

For example, the addition of the image is overlaying of the image. For example, the first image based on the first image data may be an image obtained by overlaying an additional image based on the additional image data on the captured image based on the captured image data currently being captured by the capturing unit 22. In a case where the recognition unit 26 recognizes the target object 12, the control unit 30 displays the captured image based on the captured image data currently being captured by the capturing unit 22 on the display unit of the UI unit 18 and displays the additional image in overlay on the captured image on the display unit of the UI unit 18.

For example, the second image based on the second image data may be an image obtained by overlaying the additional image on an alternative image based on the alternative image data. In a case where the recognition unit 26 does not recognize the target object 12, the control unit 30 displays the alternative image based on the alternative image data on the display unit of the UI unit 18 and displays the additional image in overlay on the alternative image on the display unit of the UI unit 18.

The overlaying of the image is merely one example of the addition of the image. For example, the additional image may be displayed next to the captured image without overlaying the additional image on the captured image. Similarly, the additional image may be displayed next to the alternative image without overlaying the additional image on the alternative image.

Figure 3:
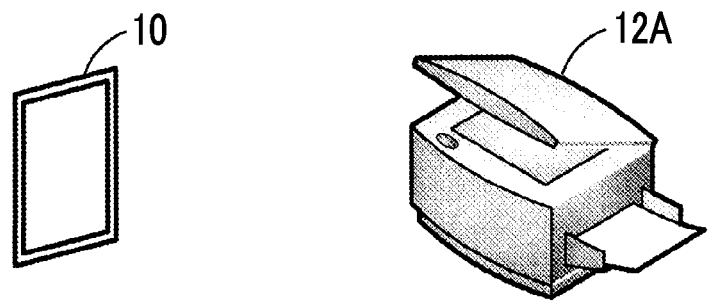
FIG. 3 is a diagram schematically illustrating the terminal device and an image forming apparatus.

Hereinafter, a process of the terminal device 10 will be described in further detail. FIG. 3 schematically illustrates the terminal device 10 and an image forming apparatus 12A as one example of the target object 12. The image forming apparatus 12A is one example of the apparatus and is an apparatus having at least one image forming function of a print function, a scan function, a copy function, or a facsimile function.

Figure 4:
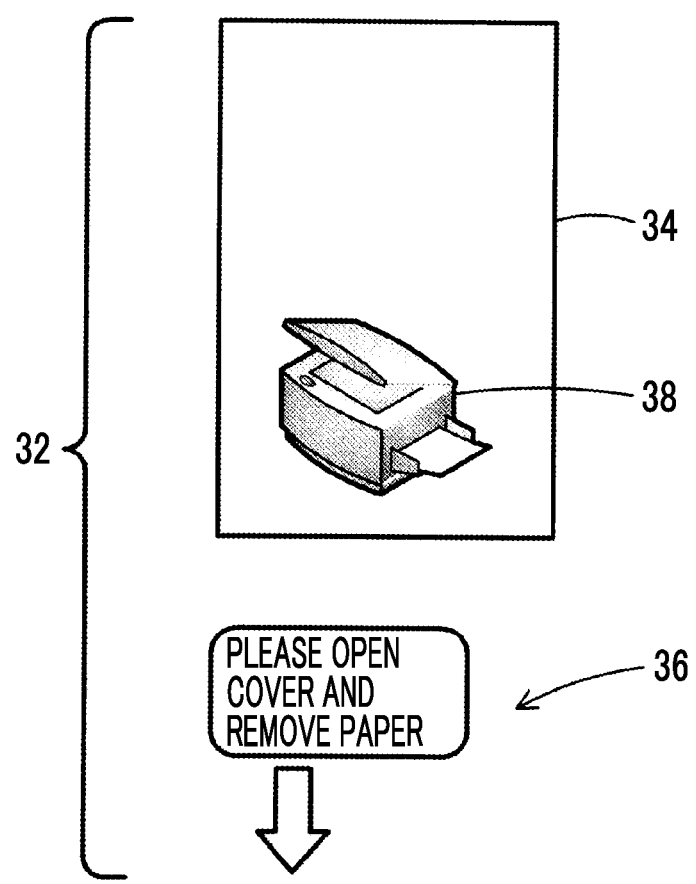
FIG. 4 is a diagram illustrating a structure of first image data.

FIG. 4 illustrates one example of the structure of the first image data. For example, first image data 32 includes captured image data 34 and additional image data 36 generated based on the target object information. The captured image data 34 is image data currently being captured by the capturing unit 22. The target object information is information obtained by the obtaining unit 28.

In a case where the user captures the image forming apparatus 12A using the capturing unit 22 of the terminal device 10, the captured image data 34 representing the image forming apparatus 12A and a scene (for example, a background) surrounding the image forming apparatus 12A is generated. Target object information 38 representing the image forming apparatus 12A is represented in the captured image data 34. An image representing the surrounding scene is not illustrated.

In the example illustrated in FIG. 4, the additional image data 36 is image data that represents a text string indicating the state of the image forming apparatus 12A and an arrow pointing at the image forming apparatus 12A. For example, a paper jam error occurs in the image forming apparatus 12A, and the state information indicating the occurrence of the error is included in the target object information. The arrow may point at a part in which the error occurs. In addition, an animation or a text string for informing the user of a method for recovering from the error may be included in the additional image data 36. The control unit 30 generates the additional image data 36 based on the target object information. The additional image data 36 may be included in the target object information. In this case, the control unit 30 displays the first image based on the first image data on the display unit of the UI unit 18 using the additional image data 36 included in the target object information without generating the additional image data 36.

Figure 5:
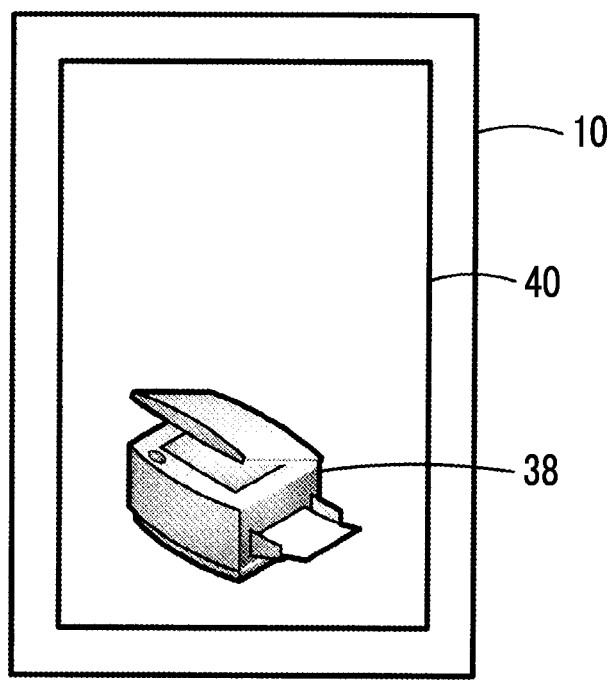
FIG. 5 is a diagram illustrating a display example of a captured image.

FIG. 5 illustrates a display example of the captured image. The control unit 30 displays the captured image based on the captured image data 34 on the display unit of the UI unit 18. The captured image is displayed on a screen 40 of the display unit. For example, the captured image is a moving image currently being captured by the capturing unit 22. Since the image forming apparatus 12A is included in the angle of view of the capturing unit 22, that is, a range captured by the capturing unit 22, a target object image 38 representing the image forming apparatus 12A is represented in the captured image. In this scene, the target object information is not yet obtained by the obtaining unit 28. Thus, the additional image based on the additional image data 36 is not displayed.

In a case where the obtaining unit 28 obtains the target object information of the image forming apparatus 12A and the recognition unit 26 recognizes the image forming apparatus 12A, the control unit 30 displays the first image based on the first image data 32 on the display unit of the UI unit 18.

For example, the recognition unit 26 obtains the identification information of the image forming apparatus 12A by recognizing the image forming apparatus 12A based on the captured image data currently being captured by the capturing unit 22. The specifying unit 24 specifies the image forming apparatus 12A recognized by the recognition unit 26 as the target object 12 of the target for obtaining the target object information and outputs the identification information of the image forming apparatus 12A to the obtaining unit 28. The obtaining unit 28 obtains the target object information associated with the identification information from the information management database 14, the image forming apparatus 12A, the external apparatus, or the storage unit 20. The control unit 30 generates the additional image data based on the target object information obtained by the obtaining unit 28. The control unit 30 displays the first image based on the first image data obtained by adding the additional image data to the captured image data on the display unit of the UI unit 18. The image forming apparatus 12A may be specified as the target object 12 of the target for obtaining the target object information by the user inputting the identification information of the image forming apparatus 12A.

Figure 6:
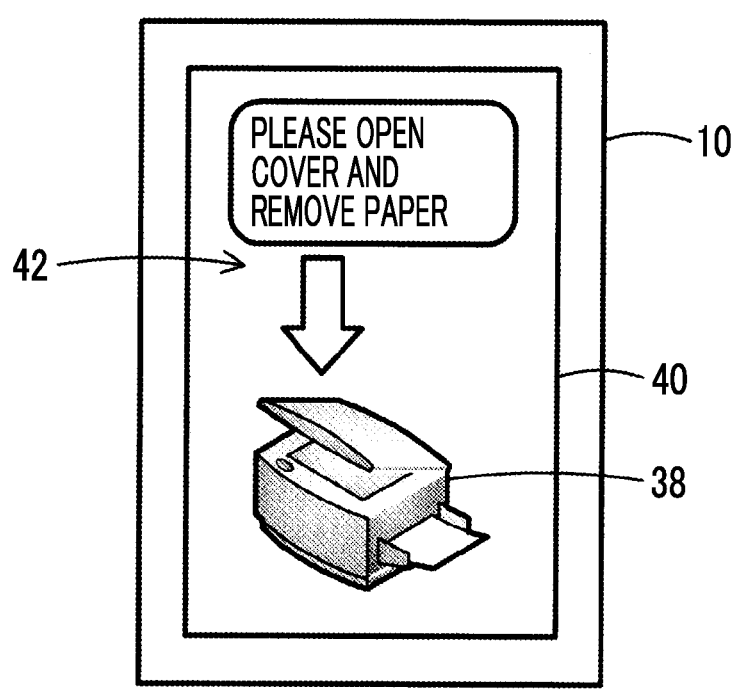
FIG. 6 is a diagram illustrating a display example of a first image.

FIG. 6 illustrates a display example of the first image. The captured image including the target object image 38 and an additional image 42 based on the additional image data 36 are displayed on the screen 40. The additional image 42 is added to the captured image and displayed. For example, the additional image 42 is displayed in overlay on the captured image. The additional image 42 may be displayed in the surrounding area of the target object image 38 not in overlap with the target object image 38 or may be displayed in overlap with the target object image 38. For example, the first image including the captured image and the additional image is displayed using AR technology.

For example, in a case where the image forming apparatus 12A is included in the angle of view of the capturing unit 22 such that the recognition unit 26 may recognize the image forming apparatus 12A, and the image forming apparatus 12A is represented in the captured image data 34, the recognition unit 26 recognizes the image forming apparatus 12A. Then, the first image is displayed.

Figure 7:
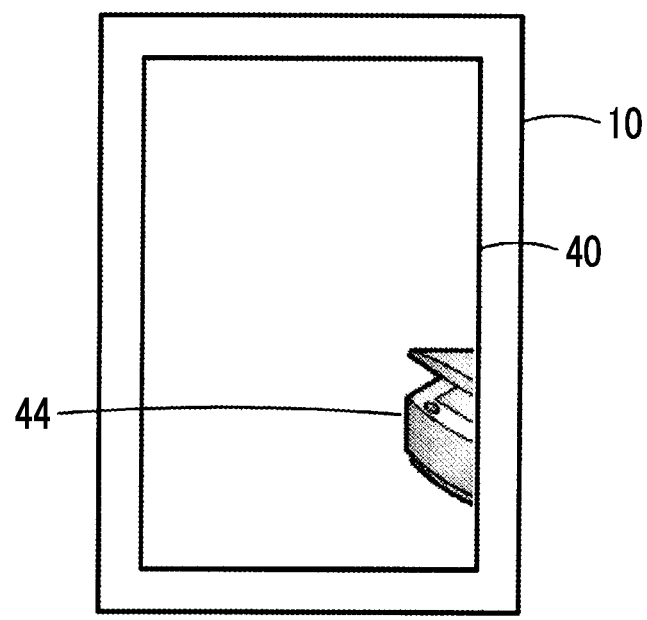
FIG. 7 is a diagram illustrating a display example of the captured image.

In a case where the image forming apparatus 12A is not included in the angle of view of the capturing unit 22 such that the recognition unit 26 may recognize the image forming apparatus 12A, the recognition unit 26 does not recognize the image forming apparatus 12A. For example, only a part of the image forming apparatus 12A is included in the angle of view of the capturing unit 22, and only an image 44 of the part is included in the captured image displayed on the screen 40 as illustrated in FIG. 7. In a case where the recognition unit 26 does not recognize the image forming apparatus 12A from only the image 44 of the part, the control unit 30 displays the second image based on the second image data on the display unit of the UI unit 18.

For example, in a case where the recognition unit 26 does not recognize the image forming apparatus 12A anymore as illustrated in FIG. 7 after the recognition unit 26 recognizes the image forming apparatus 12A as illustrated in FIG. 6, the control unit 30 displays the second image on the display unit of the UI unit 18 instead of the first image.

The control unit 30 obtains the alternative image data associated with the identification information of the image forming apparatus 12A from the storage unit 20, the information management database 14, or the external apparatus. As another example, the control unit 30 may obtain the alternative image data associated with the type information of the image forming apparatus 12A. Next, the control unit 30 generates the second image data by adding the additional image data to the alternative image data and displays the second image based on the second image data on the display unit of the UI unit 18.

Figure 8:
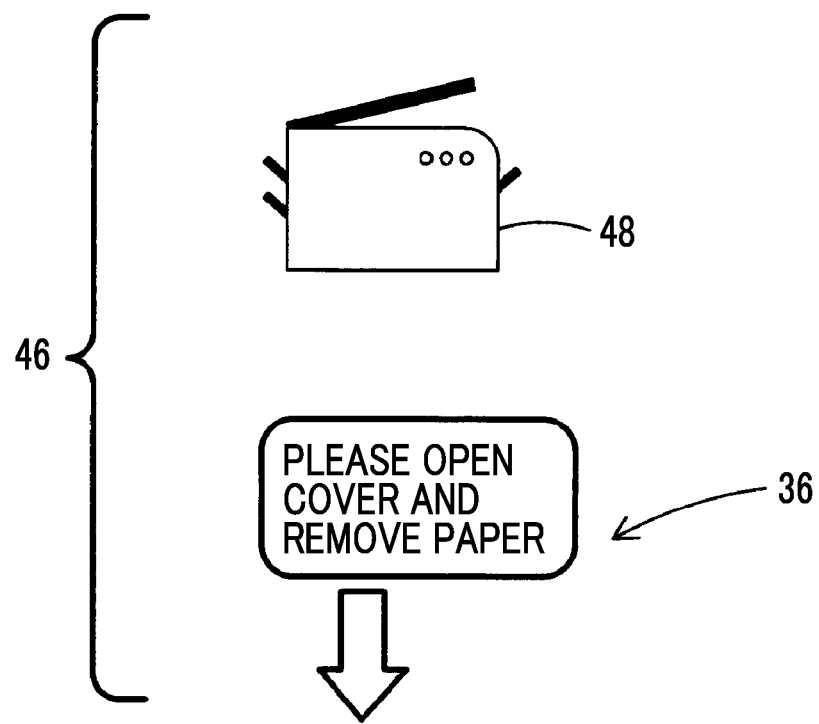
FIG. 8 is a diagram illustrating a structure of second image data.

FIG. 8 illustrates one example of the structure of the second image data. For example, second image data 46 includes alternative image data 48 and the additional image data 36. For example, the alternative image data 48 may be two-dimensional image data or three-dimensional image data schematically representing the image forming apparatus 12A, image data generated by capturing the image forming apparatus 12A in the past, general-purpose image data, or data of a simple figure (for example, a rectangle, a circle, or an ellipse). For example, in a case where data of the target object image 38 illustrated in FIG. 4 is stored in the storage unit 20, the alternative image data 48 may be the data of the target object image 38.

Figure 9:
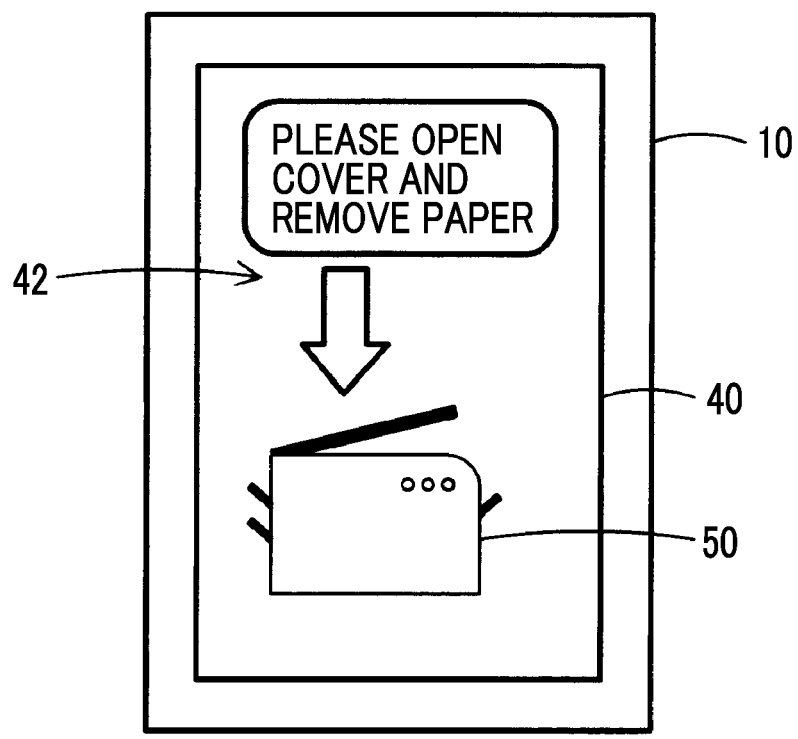
FIG. 9 is a diagram illustrating a display example of a second image.

FIG. 9 illustrates a display example of the second image. An alternative image 50 based on the alternative image data 48 and the additional image 42 based on the additional image data 36 are displayed on the screen 40. The additional image 42 is added to the alternative image 50 and displayed. For example, the additional image 42 may be displayed in the surrounding area of the alternative image 50 not in overlap with the alternative image 50 or may be displayed in overlap with the alternative image 50.

In a case where the state (for example, the error) indicated by the target object information is resolved when the first image or the second image is displayed, the control unit 30 may not display the additional image 42.

Figure 10:
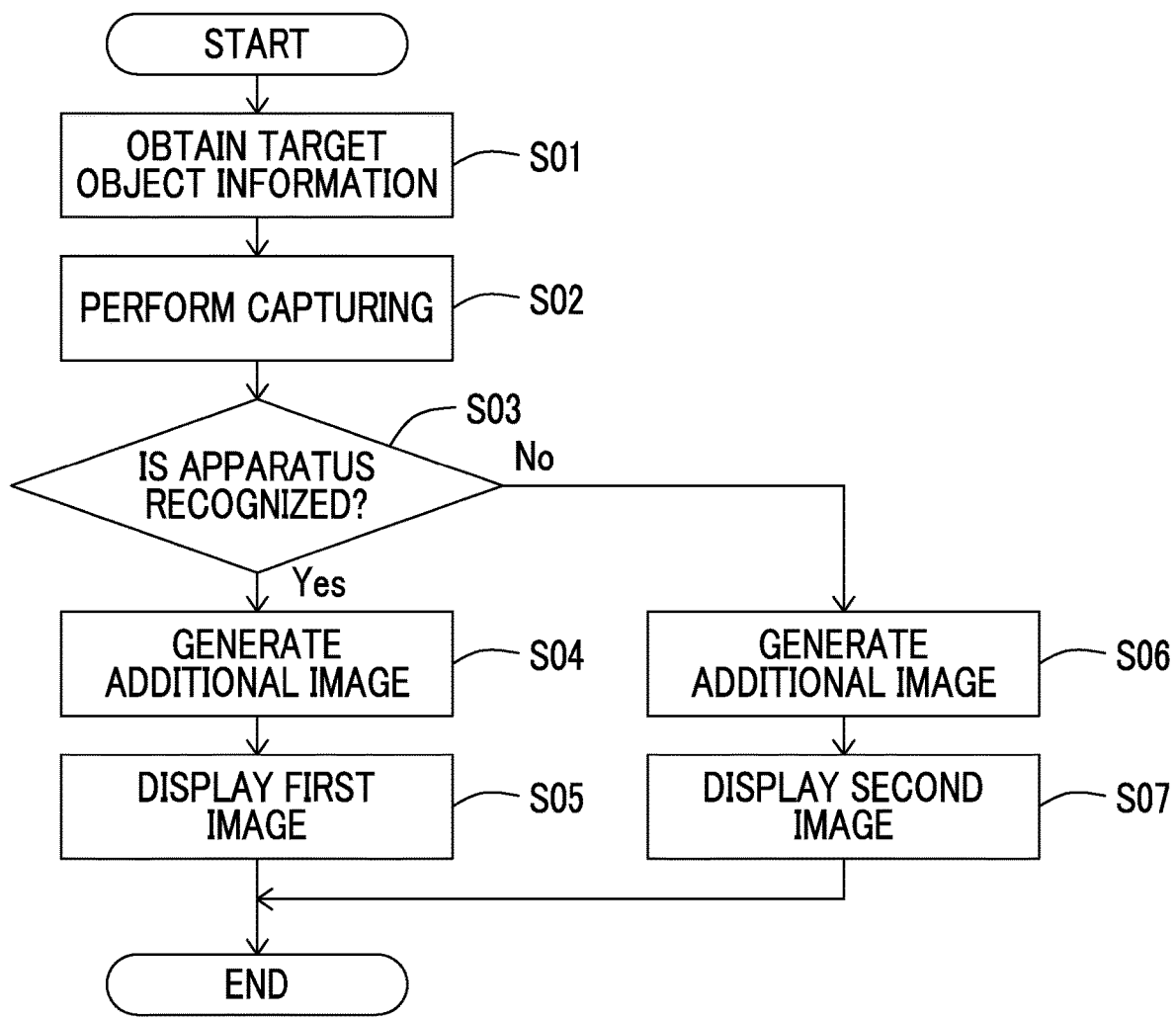
FIG. 10 is a flowchart illustrating a process of the terminal device.

Hereinafter, the flow of process of the terminal device 10 will be described with reference to FIG. 10. FIG. 10 is a flowchart illustrating the process of the terminal device 10.

First, the obtaining unit 28 obtains the target object information of the image forming apparatus 12A (S01). For example, in a case where the user designates the image forming apparatus 12A as the target object 12 of the target for obtaining the target object information using the UI unit 18, the specifying unit 24 specifies the image forming apparatus 12A as the target object 12 of the target for obtaining the target object information. In addition, the specifying unit 24 may specify the image forming apparatus 12A recognized by the recognition unit 26 as the target object 12 of the target for obtaining the target object information. The obtaining unit 28 obtains the target object information of the specified image forming apparatus 12A.

For example, the information management database 14 is disposed in the image forming apparatus 12A as a management information base (MIB), and the obtaining unit 28 obtains the target object information from the information management database 14 disposed in the image forming apparatus 12A. Specifically, the communication unit 16 communicates with the image forming apparatus 12A through the communication path N. Address information (for example, an IP address) of the image forming apparatus 12A used in the communication may be input by the user, may be obtained from the image forming apparatus 12A by the short-range wireless communication, or may be stored in advance in the storage unit 20. The obtaining unit 28 obtains the target object information from the information management database 14 by the communication established by the communication unit 16. For example, a simple network management protocol (SNMP) is used in the communication. For example, the target object information of the image forming apparatus 12A includes the identification information, the type information, the state information, and the configuration information. In a case where a paper jam error occurs in the image forming apparatus 12A, information indicating the paper jam error is included in the state information. In a case where a toner depletion error occurs in the image forming apparatus 12A, information indicating the toner depletion error is included in the state information. Such information is transmitted to the MIB from the apparatus such as the image forming apparatus 12A and is managed in the MIB. For example, information indicating the number of optional trays is included in the configuration information.

The obtaining unit 28 may obtain the target object information from the external apparatus such as a server, the captured image data, or the storage unit 20.

Next, the user performs capturing using the capturing unit 22 of the terminal device 10 (S02). The captured image data is generated by the capturing, and the captured image based on the captured image data is displayed on the display unit of the UI unit 18. For example, the captured image illustrated in FIG. 5 or the captured image illustrated in FIG. 7 is displayed.

The user may perform capturing using the capturing unit 22 before the obtaining unit 28 obtains the target object information. In this case, in a case where the recognition unit 26 recognizes the image forming apparatus 12A based on the captured image data, the specifying unit 24 may specify the recognized image forming apparatus 12A as the target object 12 of the target for obtaining the target object information.

In a case where the recognition unit 26 recognizes the image forming apparatus 12A from the captured image data currently being captured by the capturing unit 22 (Yes in S03), the control unit 30 generates the additional image data based on the target object information obtained by the obtaining unit 28 (S04). The control unit 30 displays the first image based on the first image data on the display unit of the UI unit 18 by adding the additional image data to the captured image data currently being captured by the capturing unit 22 (S05). For example, the first image illustrated in FIG. 6 is displayed. For example, an image of an arrow pointing at a part in which a paper jam error occurs may be displayed, or an animation representing a state of a closing cover may be displayed.

In a case where the recognition unit 26 does not recognize the image forming apparatus 12A from the captured image data currently being captured by the capturing unit 22 (No in S03), the control unit 30 generates the additional image data based on the target object information obtained by the obtaining unit 28 (S06). The control unit 30 displays the second image based on the second image data on the display unit of the UI unit 18 by adding the additional image data to the alternative image data associated with the image forming apparatus 12A (S07). For example, the second image illustrated in FIG. 9 is displayed.

In a case where the recognition unit 26 recognizes the image forming apparatus 12A when the second image is displayed, the control unit 30 may display the first image on the display unit of the UI unit 18 instead of the second image.

In addition, in a case where the recognition unit 26 does not recognize the image forming apparatus 12A anymore after the recognition unit 26 recognizes the image forming apparatus 12A and the first image is displayed, the control unit 30 may display the second image on the display unit of the UI unit 18 instead of the first image.

The control unit 30 may output information included in the target object information as a voice from the voice output unit of the UI unit 18 along with the display of the first image or the second image or without displaying the first image and the second image. For example, information indicating the occurrence of the error or information indicating the method for recovering from the error may be output as a voice from the voice output unit.

In addition, the control unit 30 may execute either the output of the voice or the display of the second image depending on the state of the image forming apparatus 12A. For example, in a case where the error occurring in the image forming apparatus 12A is a simple error, the control unit 30 outputs information included in the target object information as a voice from the voice output unit of the UI unit 18. In a case where the error occurring in the image forming apparatus 12A is complicated, the control unit 30 displays the second image on the display unit of the UI unit 18. In a case where plural works have to be executed, the control unit 30 may execute either the output of the voice or the display of the second image for each work depending on the content of the work.

In a case where the recognition unit 26 does not recognize the image forming apparatus 12A, the control unit 30 may display an error message or the like that is stored in advance in the storage unit 20 and corresponds to the state of the image forming apparatus 12A on the display unit of the UI unit 18. In a case where the recognition unit 26 recognizes the image forming apparatus 12A when the error message or the like is displayed, the control unit 30 displays the first image on the display unit of the UI unit 18 instead of the error message or the like. The error message or the like may be output as a voice.

In a case where the image forming apparatus 12A is represented in the captured image captured by the capturing unit 22, the control unit 30 may display the first image on the display unit of the UI unit 18. In a case where the image forming apparatus 12A is not represented anymore in the captured image after the image forming apparatus 12A is represented in the captured image, the control unit 30 may display the second image on the display unit of the UI unit 18. For example, in a case where the image forming apparatus 12A is represented in the captured image such that the recognition unit 26 may recognize the image forming apparatus 12A, the control unit 30 displays the first image on the display unit. In a case where the image forming apparatus 12A is not represented in the captured image such that the recognition unit 26 may recognize the image forming apparatus 12A, the control unit 30 displays the second image on the display unit of the UI unit 18.

Modification Example 1

Hereinafter, a process according to Modification Example 1 will be described with reference to FIG. 11. FIG. 11 is a flowchart illustrating the process according to Modification Example 1.

Processes of step S10 to step S14 in FIG. 11 are the same processes as the processes of step S01 to step S05 in FIG. 10. Thus, descriptions of the processes of step S10 to step S14 will not be repeated, and processes from step S15 will be described.

The control unit 30 stores the first image data in the storage unit 20 (S15). In addition, the control unit 30 stores the target object information obtained by the obtaining unit 28 in the storage unit 20 in association with the first image data. The control unit 30 may separately store the captured image data and the additional image data in the storage unit 20 or may store the first image data obtained by adding the additional image data to the captured image data in the storage unit 20. The control unit 30 may store the most recent first image data in the storage unit 20 and delete the first image data other than the most recent first image data from the storage unit 20. As another example, the control unit 30 may update the first image data stored in the storage unit 20 to the newly generated first image data for each predetermined period. As still another example, the control unit 30 may update the first image data stored in the storage unit 20 to the newly generated first image data in a case where there is a change in target object information.

In a case where the recognition unit 26 does not recognize the image forming apparatus 12A from the captured image data currently being captured by the capturing unit 22 (No in S12), the process transitions to step S16.

In a case where the same target object information as the target object information obtained in step S10 is stored in the storage unit 20 (Yes in S16), the control unit 30 reads the first image data stored in the storage unit 20 in association with the target object information from the storage unit 20 and displays the first image based on the first image data on the display unit of the UI unit 18 as the second image of the image forming apparatus 12A (S17).

In a case where the recognition unit 26 recognizes the image forming apparatus 12A when the first image based on the first image data stored in the storage unit 20 is displayed, the control unit 30 displays the first image based on the first image data including the captured image data currently being captured by the capturing unit 22 on the display unit of the UI unit 18 instead of the first image based on the first image data stored in the storage unit 20.

In addition, the control unit 30 may store the most recent first image data in the storage unit 20. In this case, in a case where the image forming apparatus 12A is not recognized by the recognition unit 26 anymore after the image forming apparatus 12A is recognized by the recognition unit 26 and the first image is displayed in step S14, the control unit 30 may display the first image based on the most recent first image data stored in the storage unit 20 on the display unit of the UI unit 18.

In a case where the same target object information as the target object information obtained in step S10 is not stored in the storage unit 20, the control unit 30 generates the additional image data based on the target object information obtained in step S10 (S18). The control unit 30 displays the second image based on the second image data on the display unit of the UI unit 18 by adding the additional image data to the alternative image data (S19).

For example, in a case where the target object information indicating the same name, type, and configuration as the name, the type, and the configuration indicated by the target object information obtained in step S10 is not stored in the storage unit 20, the image forming apparatus 12A is a target object different from the target object 12 captured in the past. Thus, the control unit 30 does not display the first image based on the first image data stored in the storage unit 20 on the display unit of the UI unit 18. In addition, even in a case where the target object information indicating the same name, type, and configuration as the name, the type, and the configuration indicated by the target object information obtained in step S10 is stored in the storage unit 20, the current state of the image forming apparatus 12A is different from the state of the image forming apparatus 12A captured in the past in a case where the target object information indicating the same state as the state indicated by the target object information obtained in step S10 is not stored in the storage unit 20. Thus, the control unit 30 does not display the first image based on the first image data stored in the storage unit 20 on the display unit of the UI unit 18.

Modification Example 2

Hereinafter, a process according to Modification Example 2 will be described. In Modification Example 2, the control unit 30 does not display the second image on the display unit of the UI unit 18 until a predetermined amount of time elapses from a time at which the first image is displayed on the display unit of the UI unit 18.

For example, in a case where a state where the recognition unit 26 does not recognize the image forming apparatus 12A after the recognition unit 26 recognizes the image forming apparatus 12A continues for the predetermined amount of time or longer, the control unit 30 displays the second image on the display unit of the UI unit 18. The amount of period may be changed by the user or may be set for each type of target object 12 or each target object information.

In other words, in a case where the state where the recognition unit 26 does not recognize the image forming apparatus 12A does not continue for the predetermined amount of time or longer, the control unit 30 does not display the second image on the display unit of the UI unit 18.

For example, in a case where the image forming apparatus 12A captured by the capturing unit 22 departs from the angle of view of the capturing unit 22 and the recognition unit 26 temporarily does not recognize the image forming apparatus 12A, the second image is not displayed.

Modification Example 3

Hereinafter, a process according to Modification Example 3 will be described. In Modification Example 3, in a case where the terminal device 10 is at a standstill in a state where the recognition unit 26 does not recognize the image forming apparatus 12A, the control unit 30 displays the second image on the display unit of the UI unit 18. Specifically, in a case where the terminal device 10 is at a standstill in a state where the recognition unit 26 does not recognize the image forming apparatus 12A after the recognition unit 26 recognizes the image forming apparatus 12A, the control unit 30 displays the second image on the display unit of the UI unit 18.

For example, a sensing unit such as a gyro sensor or an acceleration sensor is disposed in the terminal device 10, and the control unit 30 senses a motion of the terminal device 10 based on a sensing result of the sensing unit. In addition, the control unit 30 may sense the motion of the terminal device 10 based on the captured image data. For example, in a case where the amount of change in captured image data becomes greater than or equal to a threshold, the control unit 30 determines that the terminal device 10 is moving. In a case where the motion of the terminal device 10 is not sensed, the control unit 30 determines that the terminal device 10 is at a standstill.

Modification Example 3 will be described in further detail with reference to FIG. 12. FIG. 12 illustrates a condition for displaying the first image or the second image. The condition is a combination of the length of the amount of time in which the recognition unit 26 does not recognize the target object 12 and the length of the amount of time in which the terminal device 10 is at a standstill.

In FIG. 12, an X amount of time is a threshold related to the length of the amount of elapsed time from when the recognition unit 26 does not recognize the target object 12 anymore. In FIG. 12, a Y amount of time is a threshold related to the length of the amount of time in which the terminal device 10 is at a standstill. For example, the relationship between the length of the X amount of time and the length of the Y amount of time is X amount of time >Y amount of time. For example, the X amount of time is 5 seconds, and the Y amount of time is 1 second. These values are merely for illustrative purposes. Other values may be used, or the values may be changed by the user.

For example, in a case where the terminal device 10 is moving in a state where the recognition unit 26 does not recognize the image forming apparatus 12A after the recognition unit 26 recognizes the image forming apparatus 12A, the control unit 30 displays the second image on the display unit of the UI unit 18 after the X amount of time elapses from when the recognition unit 26 does not recognize the image forming apparatus 12A anymore. For example, this display control is performed in a case where Condition (3) in FIG. 12 is satisfied. For example, a situation where the terminal device 10 is accommodated in a pocket of clothes of the user is considered as a situation where Condition (3) is satisfied.

In a case where the terminal device 10 is at a standstill in a state where the recognition unit 26 does not recognize the image forming apparatus 12A anymore after the recognition unit 26 recognizes the image forming apparatus 12A, the control unit 30 displays the second image on the display unit of the UI unit 18 after the Y amount of time elapses from when the terminal device 10 comes to a standstill. For example, this display control is performed in a case where Condition (1) or Condition (2) in FIG. 12 is satisfied. For example, a situation where the terminal device 10 is placed on a floor or the like is considered as a situation where Condition (1) or Condition (2) is satisfied.

The control unit 30 displays the first image on the display unit of the UI unit 18 under conditions other than Conditions (1) to (3). For example, the first image is displayed in a case where Condition (4) in FIG. 12 is satisfied. For example, a situation where the image forming apparatus 12A is temporarily not recognized during the capturing of the image forming apparatus 12A by the capturing unit 22 is considered as a situation where Condition (4) is satisfied.

The relationship between the length of the X amount of time and the length of the Y amount of time may be changed by the user.

In addition, in a case where the second image is displayed on the display unit of the UI unit 18 due to the terminal device 10 coming to a standstill in a state where the recognition unit 26 does not recognize the image forming apparatus 12A after the recognition unit 26 recognizes the image forming apparatus 12A, and then, the terminal device 10 moves, the control unit 30 displays the captured image based on the captured image data currently being captured by the capturing unit 22 on the display unit of the UI unit 18.

For example, in a case where the terminal device 10 moves in a state where the second image is displayed on the display unit of the UI unit 18 by satisfying Condition (1) or Condition (2), the captured image is displayed on the display unit of the UI unit 18.

In a case where the terminal device 10 moves for a predetermined amount of time or longer in a state where the second image is displayed on the display unit of the UI unit 18 due to the terminal device 10 coming to a standstill, the control unit 30 may display the captured image on the display unit of the UI unit 18 instead of the second image. The amount of period may be changed by the user or may be set for each type of target object 12 or each target object information.

In other words, even in a case where the terminal device 10 moves in a state where the second image is displayed on the display unit of the UI unit 18 due to the terminal device 10 coming to a standstill, the control unit 30 displays the second image on the display unit of the UI unit 18 without switching the displayed image to the captured image from the second image unless the terminal device 10 moves for the predetermined amount of time or longer.

Modification Example 4

Figure 13:
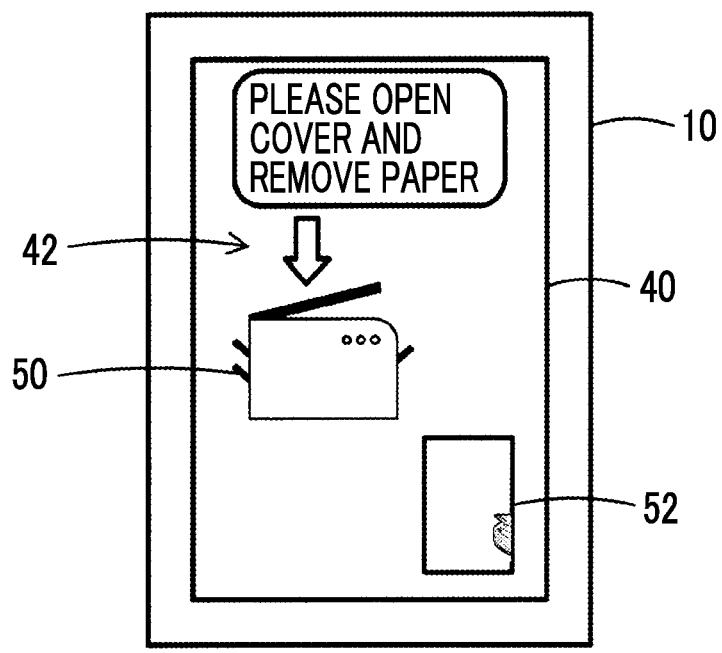
FIG. 13 is a diagram illustrating a display example of the second image and the captured image.
Figure 14:
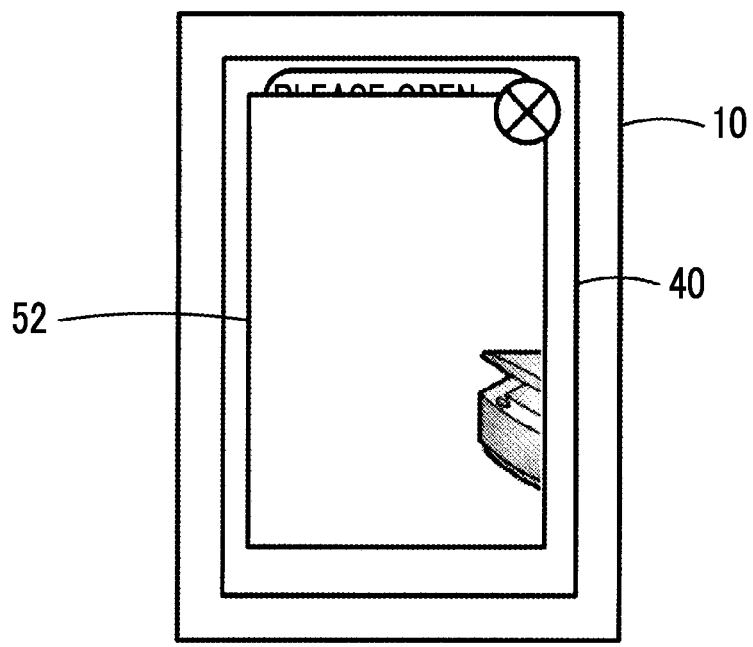
FIG. 14 is a diagram illustrating a display example of the captured image.

Hereinafter, a process according to Modification Example 4 will be described with reference to FIG. 13 and FIG. 14. FIG. 13 and FIG. 14 illustrates the screen. In Modification Example 4, the control unit 30 displays both of the second image and the captured image on the display unit of the UI unit 18.

FIG. 13 illustrates a display example. The control unit 30 displays the second image on the display unit of the UI unit 18. Accordingly, the alternative image 50 and the additional image 42 are displayed on the screen 40 in the same manner as the display example illustrated in FIG. 9. Furthermore, the control unit 30 displays the captured image 52 currently being captured by the capturing unit 22 on the screen 40 on which the second image is displayed. The captured image 52 is displayed at a position and a size not hindering the display of the alternative image 50 and the additional image 42. For example, the captured image 52 is displayed at a position and a size not in overlap with the image of the target object in the alternative image 50 and the additional image 42. Specifically, the captured image 52 is displayed near a lower corner of the screen 40. For example, the size of the captured image 52 is smaller than the size of the alternative image 50. The display position of the captured image 52 may be changed by the user.

In addition, in a case where the user designates the captured image 52 (for example, in a case where the captured image 52 is tapped or clicked), the control unit 30 enlarges the captured image 52 and displays the enlarged captured image 52 on the display unit of the UI unit 18 as illustrated in FIG. 14. The captured image 52 may be displayed in overlay on the second image or may be displayed instead of the second image. The size of the captured image 52 may be changed by the user.

In a case where the user designates the enlarged captured image 52 or provides an instruction to reduce the display of the enlarged captured image 52, the captured image 52 is reduced and displayed as illustrated in FIG. 13. For example, a reduction button image is displayed at a corner of the enlarged captured image 52. In a case where the user taps the reduction button image, the captured image 52 is reduced and displayed. Then, the second image is displayed.

The enlarged display and reduced display of the captured image 52 may be switched by a voice instruction from the user.

The control unit 30 may display the second image and the captured image 52 next to each other on the display unit of the UI unit 18. For example, the screen 40 is divided into a display area for the second image and a display area for the captured image 52. The second image is displayed in the display area for the second image, and the captured image 52 is displayed in the display area for the captured image 52. The size of the display area for the second image and the size of the display area for the captured image 52 may be the same or different from each other. In addition, the size and position of each display area may be changed by the user.

In addition, in a case where the second image and the reduced captured image 52 are displayed as illustrated in FIG. 13 in a state where the terminal device 10 is at a standstill, the control unit 30 may enlarge the captured image 52 and display the enlarged captured image 52 on the display unit of the UI unit 18 as illustrated in FIG. 14 in a case where the terminal device 10 moves. The control unit 30 may enlarge the captured image 52 in a case where the terminal device 10 continuously moves for a predetermined amount of time or longer.

Modification Example 5

Figure 15:
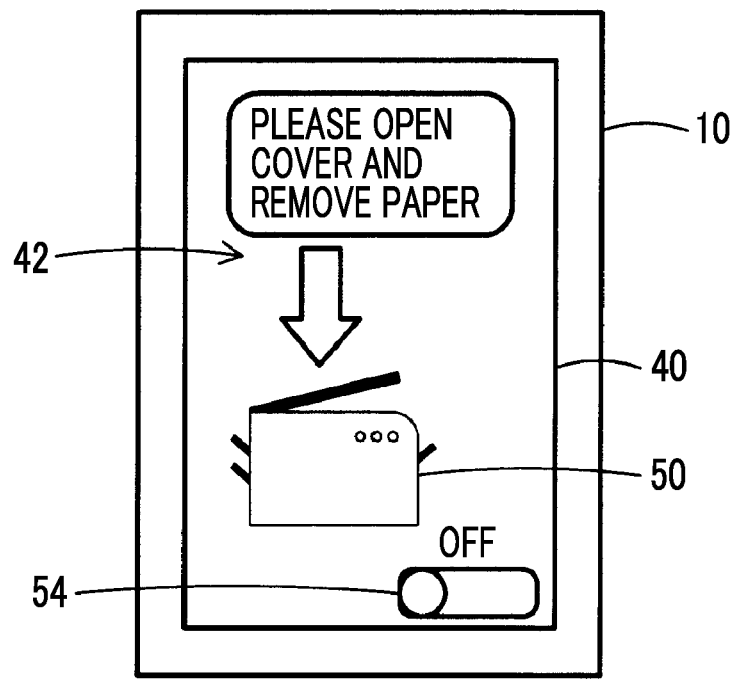
FIG. 15 is a diagram illustrating a display example of the second image.
Figure 16:
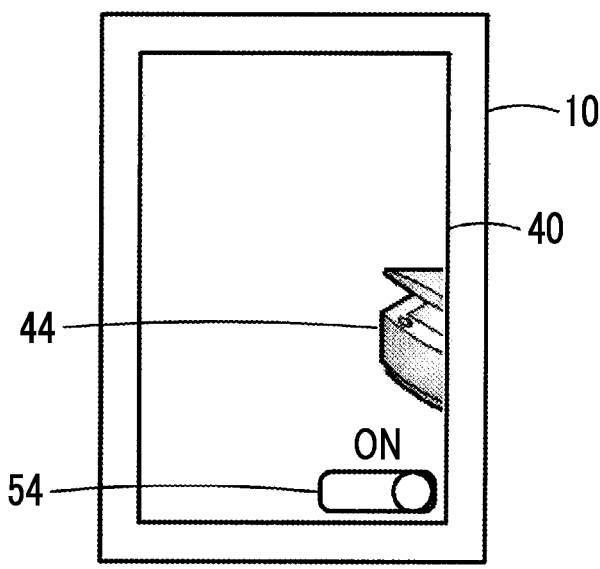
FIG. 16 is a diagram illustrating a display example of the captured image.

Hereinafter, a process according to Modification Example 5 will be described with reference to FIG. 15 and FIG. 16. FIG. 15 and FIG. 16 illustrates the screen. In Modification Example 5, the control unit 30 displays an image for switching between the display of the captured image currently being captured by the capturing unit 22 and the display of the second image on the display unit of the UI unit 18. Hereinafter, the image for switching will be referred to as a "switching button image".

FIG. 15 illustrates a display example of the switching button image. The control unit 30 displays the second image on the display unit of the UI unit 18. Accordingly, the alternative image 50 and the additional image 42 are displayed on the screen 40 in the same manner as the display example illustrated in FIG. 9. Furthermore, the control unit 30 displays a switching button image 54 on the screen 40 on which the second image is displayed. For example, the switching button image 54 is displayed at a position and a size not hindering the display of the alternative image 50 and the additional image 42. For example, the switching button image 54 is displayed at a position and a size not in overlap with the alternative image 50 and the additional image 42. Specifically, the switching button image 54 is displayed near a lower corner of the screen 40. In addition, the display position and size of the switching button image 54 may be changed by the user.

The switching button image 54 when the second image is displayed represents that the displayed image is the second image. For example, a switch represented in the switching button image 54 is displayed at a position indicating the display of the second image. In addition, a text string (for example, a text string "OFF") indicating that the displayed image is the second image and not the captured image is displayed along with the switching button image 54.

In a case where the user provides an instruction to switch to the display of the captured image from the display of the second image by operating the switching button image 54 in a state where the second image is displayed, the control unit 30 displays the captured image currently being captured by the capturing unit 22 on the display unit of the UI unit 18 instead of the second image as illustrated in FIG. 16. The image 44 representing the part of the image forming apparatus 12A is displayed on the screen 40 illustrated in FIG. 16 in the same manner as the display example illustrated in FIG. 7. In this state, the recognition unit 26 does not recognize the image forming apparatus 12A, and the additional image is not displayed. In addition, the switching button image 54 is displayed.

The switching button image 54 when the captured image is displayed represents that the displayed image is the captured image. For example, the switch represented in the switching button image 54 is displayed at a position indicating the display of the captured image. In addition, a text string (for example, a text string "ON") indicating that the displayed image is the captured image is displayed along with the switching button image 54.

In a case where the user provides an instruction to switch to the display of the second image from the display of the captured image by operating the switching button image 54 in a state where the captured image is displayed, the control unit 30 displays the second image on the display unit of the UI unit 18 instead of the captured image as illustrated in FIG. 15.

In a case where the second image is displayed, the control unit 30 displays the switching button image 54 on the display unit of the UI unit 18 as illustrated in FIG. 15. In addition, in a case where the displayed image is switched to the captured image from the second image after the second image is temporarily displayed as illustrated in FIG. 15, the control unit 30 displays the switching button image 54 on the display unit of the UI unit 18 even in a case where the captured image is displayed as illustrated in FIG. 16. The switching button image 54 may be displayed in a case where the second image is displayed, and may not be displayed in a case where the captured image is displayed. In addition, the switching button image 54 may be displayed in a case where the first image is displayed, or may be displayed at all times. In addition, in a case where the displayed image is switched to the captured image from the second image, and then, the image forming apparatus 12A is recognized by the recognition unit 26 and the first image is displayed, the switching button image 54 may not be displayed anymore.

In addition, the size of the display of each of the second image and the captured image may be changed by operating the switching button image 54. For example, the switching button image 54 is displayed on the screen 40 illustrated in FIG. 13. In a case where the user operates the switching button image 54 in a state where the captured image 52 is displayed in a smaller size than the second image as illustrated in FIG. 13, the control unit 30 displays the captured image 52 in a larger size than the second image on the display unit of the UI unit 18. In a case where the user operates the switching button image 54 in a state where the captured image 52 is displayed in a larger size than the second image, the control unit 30 displays the captured image 52 in a smaller size than the second image on the display unit of the UI unit 18. The scope of the concept of a large image includes a large area of the displayed image, a wide periphery of the displayed image, and the like.

Modification Example 6

Hereinafter, a process according to Modification Example 6 will be described. In Modification Example 6, the control unit 30 displays recommendation information for prompting the user to switch between the first image and the second image is displayed on the display unit of the UI unit 18. A voice representing the recommendation information may be output.

The control unit 30 may display first recommendation information for prompting the user to switch the displayed image to the first image from the second image on the display unit of the UI unit 18 during the display of the second image.

For example, in a case where a predetermined first condition is satisfied during the display of the second image, the control unit 30 displays the first recommendation information on the display unit of the UI unit 18. Specifically, a case where the state of the image forming apparatus 12A corresponds to a state where the user may not be informed of information unless the actually captured image is displayed with the additional image added to the captured image is one example of the satisfaction of the first condition. For example, the control unit 30 determines whether or not the state of the image forming apparatus 12A corresponds to such a state based on the state information included in the target object information.

For example, in a case where the method for recovering from the error occurring in the image forming apparatus 12A is complicated, the user may understand the recovering method more easily by displaying the actually captured image with information indicating the recovering method added to the captured image than by displaying the second image. In this case, the first recommendation information is displayed. In addition, in a case where the alternative image in the second image is an image schematically representing the image forming apparatus 12A and is a general-purpose image on which a configuration and the like unique to the image forming apparatus 12A are not reflected, the alternative image may not represent the actual configuration of the image forming apparatus 12A correctly or in detail. In this case, in a case where the second image is displayed, the user may not easily understand the recovering method. Thus, the first recommendation information is displayed. In addition, in a case where the target object information is output by voice along with the display of the second image or instead of the display of the second image, the user may not easily understand the recovering method. In this case, the first recommendation information is displayed.

In addition, a case or the like where the user has to be informed of information by considering the surrounding environment of the image forming apparatus 12A is one sample of satisfying the first condition. For example, the control unit 30 recognizes the surrounding environment based on the captured image captured by the capturing unit 22 and displays the first recommendation information on the display unit of the UI unit 18 depending on the recognition result. For example, in a case where an obstacle is present around the image forming apparatus 12A, the control unit 30 displays the first recommendation information on the display unit of the UI unit 18 in a situation where the obstacle has to be displayed. In this case, the control unit 30 recognizes the obstacle based on the captured image and displays the first image including the additional image on the display unit of the UI unit 18 away from the display position of the obstacle.

Figure 17:
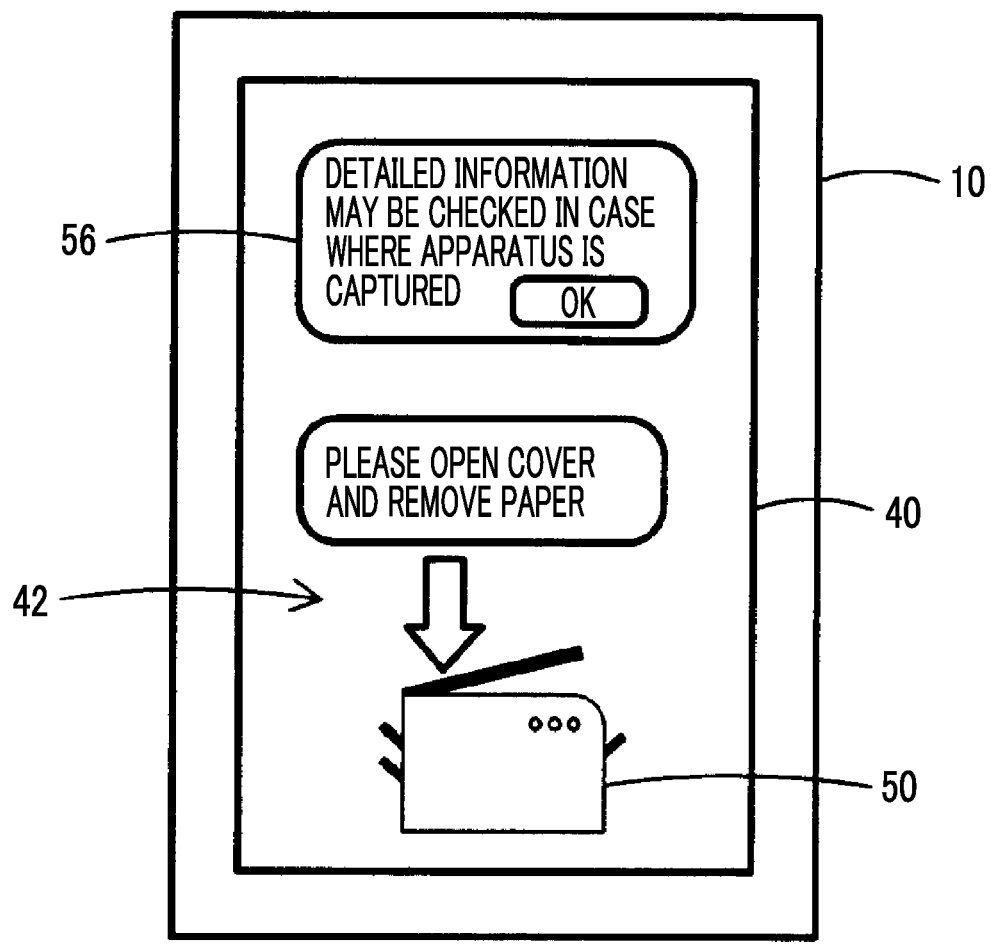
FIG. 17 is a diagram illustrating a display example of first recommendation information.

FIG. 17 illustrates a display example of the first recommendation information. The alternative image 50 included in the second image and the additional image 42 are displayed on the screen 40. In addition, an image 56 based on the first recommendation information is displayed on the screen 40. For example, the image 56 that represents a message "detailed information may be checked in a case where the apparatus is captured." is displayed. This message is a message for prompting the user to perform capturing such that the image forming apparatus 12A is recognized by the recognition unit 26.

For example, when the second image is displayed, the control unit 30 does not display the image 56 and displays the second image on the screen 40 in a case where the first condition is not satisfied. In a case where a state indicated by new target object information obtained by the obtaining unit 28 after the display of the second image is a state satisfying the first condition, the control unit 30 displays the image 56 based on the first recommendation information on the screen 40.

For example, the image 56 based on the first recommendation information may be displayed as a pop-up or may be displayed at a position and a size not hindering the display of the alternative image 50 and the additional image 42. The image 56 may also be displayed in overlay on the alternative image 50, the additional image 42, and the like. In addition, a voice representing the first recommendation information may be output.

In addition, the control unit 30 may display second recommendation information for prompting the user to switch the displayed image to the second image from the first image on the display unit of the UI unit 18 during the display of the first image.

For example, in a case where a predetermined second condition is satisfied during the display of the first image, the control unit 30 displays the second recommendation information on the display unit of the UI unit 18. Specifically, a case or the like where an event in which the user has to work with both hands occurs and the user needs to release the terminal device 10 is one example of satisfying the second condition. For example, the control unit 30 recognizes the state of the image forming apparatus based on the state information included in the target object information. In a case where the state of the image forming apparatus 12A is a state where the user has to work with both hands, the control unit 30 displays the second recommendation information on the display unit of the UI unit 18.

Figure 18:
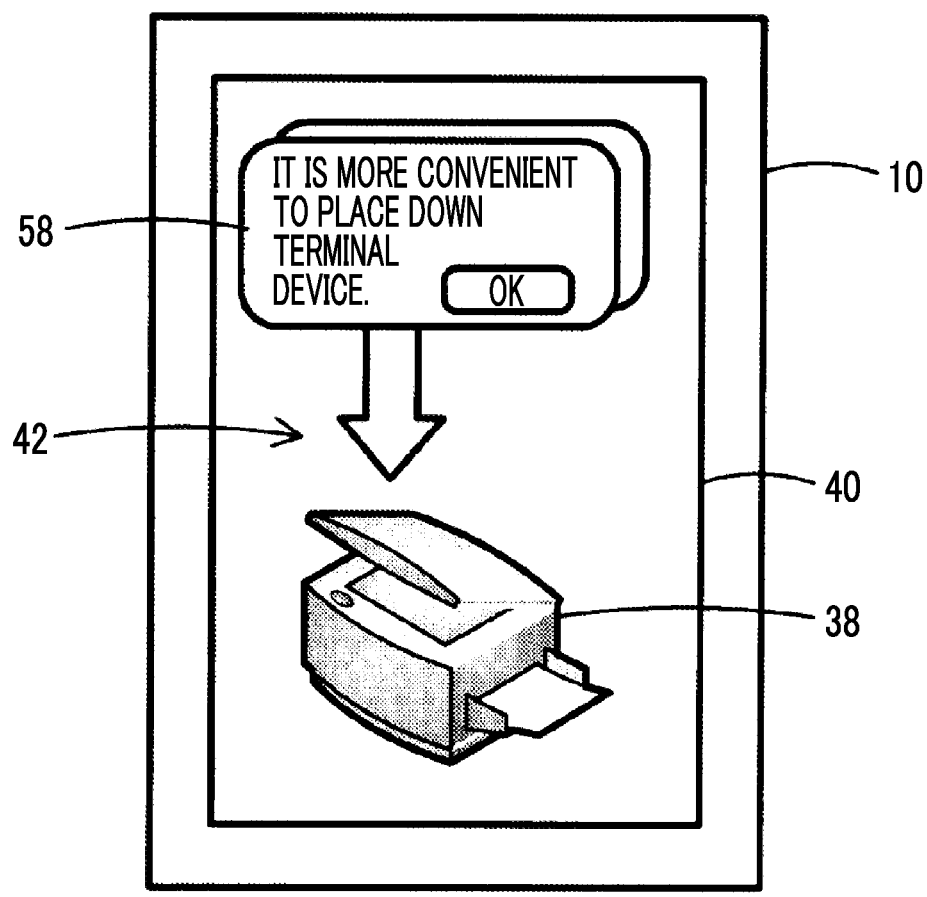
FIG. 18 is a diagram illustrating a display example of second recommendation information.

FIG. 18 illustrates a display example of the second recommendation information. The first image is displayed on the screen 40 in the same manner as the display example illustrated in FIG. 6. In addition, an image 58 based on the second recommendation information is displayed on the screen 40. For example, the image 58 that represents a message "it is more convenient to place down the terminal device." is displayed. This message is a message for prompting the user to empty both hands by placing down the terminal device 10 on the floor, a desk, or the like.

For example, when the first image is displayed, the control unit 30 does not display the image 58 and displays the first image on the screen 40 in a case where the second condition is not satisfied. In a case where a state indicated by new target object information obtained by the obtaining unit 28 after the display of the first image is a state satisfying the second condition, the control unit 30 displays the image 58 based on the second recommendation information on the screen 40.

For example, the image 58 based on the second recommendation information may be displayed as a pop-up, may be displayed at a position and a size not hindering the display of the target object image 38, or may be displayed at a position and a size not hindering the display of the target object image 38 and the additional image 42. The image 58 may also be displayed in overlay on the target object image 38 and the additional image 42. In addition, a voice representing the second recommendation information may be output.

Figure 19:
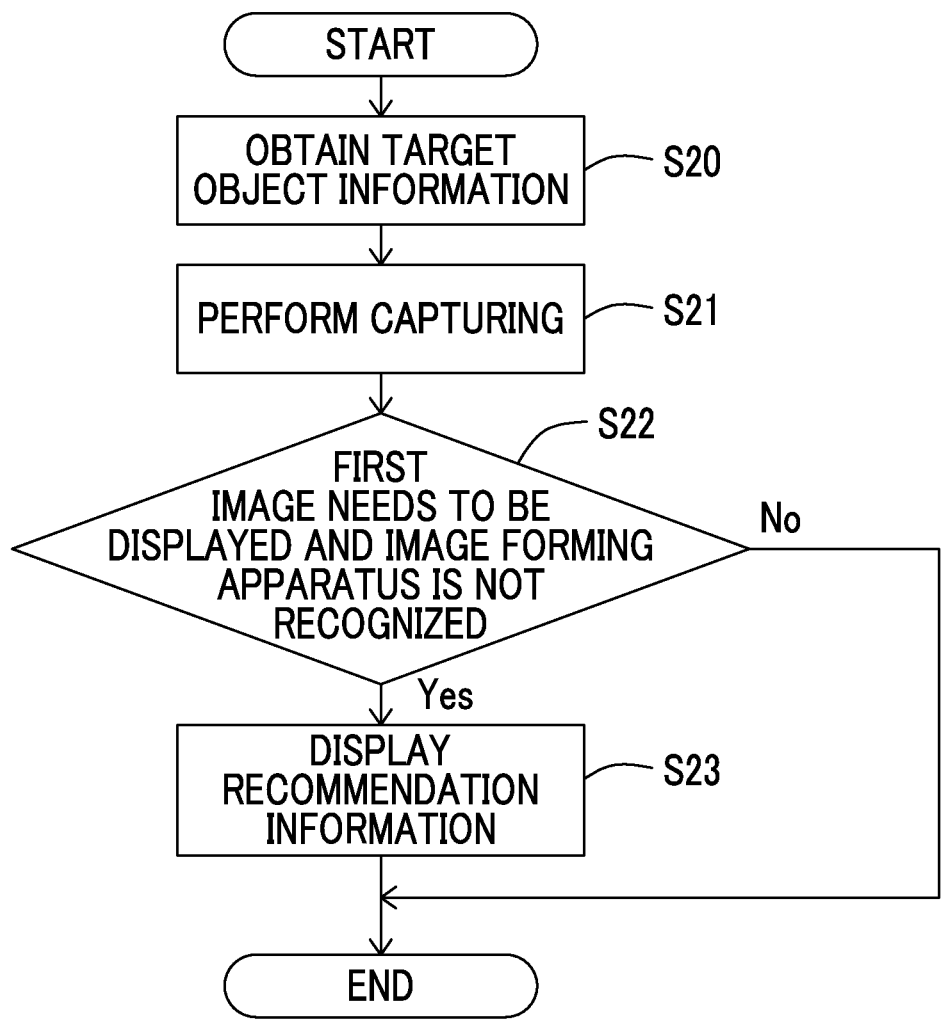
FIG. 19 is a flowchart illustrating a process according to Modification Example 6.

In addition, the first recommendation information may be displayed in a scene described below. FIG. 19 is a flowchart illustrating this process.

Processes of steps S20 and S21 in FIG. 19 are the same processes as the processes of steps S01 and S02 in FIG. 10. Thus, descriptions of the processes of steps S20 and S21 will not be repeated, and processes from step S22 will be described.

In a case where the first image needs to be displayed and the image forming apparatus 12A is not recognized by the recognition unit 26 (Yes in S22), the control unit 30 displays the first recommendation information on the display unit of the UI unit 18 (S23). For example, the first recommendation information is displayed in a case where the first condition is satisfied.

In a case where the condition in step S22 is not satisfied (No in S22), the process is ended. In this case, the captured image may be displayed, or the second image may be displayed. In a case where the image forming apparatus 12A is recognized by the recognition unit 26, the first image is displayed.

Modification Example 7

Hereinafter, an information processing system according to Modification Example 7 will be described. In Modification Example 7, a part of the process executed in the terminal device 10 is executed by the external apparatus such as a server. For example, the process of each of the specifying unit 24, the recognition unit 26, and the obtaining unit 28 is executed by the external apparatus. In this case, the specifying unit 24, the recognition unit 26, and the obtaining unit 28 are not disposed in the terminal device 10, and the processes of the specifying unit 24, the recognition unit 26, and the obtaining unit 28 are not executed in the terminal device 10. A part of the specifying unit 24, the recognition unit 26, and the obtaining unit 28 may be disposed in the terminal device 10, and the process of the part may be executed in the terminal device 10. In this case, a configuration not disposed in the terminal device 10 is disposed in the external apparatus, and the process of the configuration is executed in the external apparatus. In addition, even in a case where all of the specifying unit 24, the recognition unit 26, and the obtaining unit 28 are disposed in the terminal device 10, the processes of the specifying unit 24, the recognition unit 26, and the obtaining unit 28 may be executed by the external apparatus.

Figure 20:
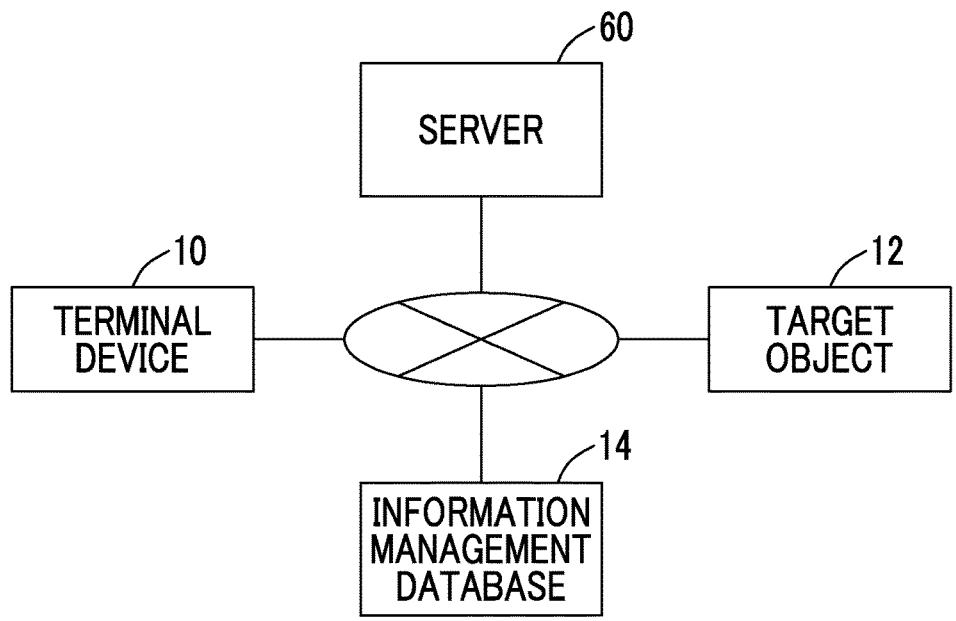
FIG. 20 is a block diagram illustrating a configuration of an information processing system according to Modification Example 7.

Hereinafter, the information processing system according to Modification Example 7 will be described in detail with reference to FIG. 20. FIG. 20 illustrates one example of a configuration of the information processing system according to Modification Example 7.

The information processing system according to Modification Example 7 includes the terminal device 10 and a server 60 as one example of the external apparatus. The server 60 may communicate with the terminal device 10, the target object 12, and the information management database 14 through the communication path N. Plural terminal devices 10 may be included in the information processing system according to Modification Example 7. Plural servers 60 may be included in the information processing system according to Modification Example 7.

The server 60 generates the first image data and the second image data and transmits the first image data and the second image data to the terminal device 10. The captured image data for generating the first image data is transmitted to the server 60 from the terminal device 10. In a case where plural terminal devices 10 are included in the information processing system, the server 60 may receive the captured image data from each terminal device 10. In this case, the server 60 may transmit the first image data generated based on the captured image data transmitted from a certain terminal device 10 to other terminal devices 10.

Figure 21:
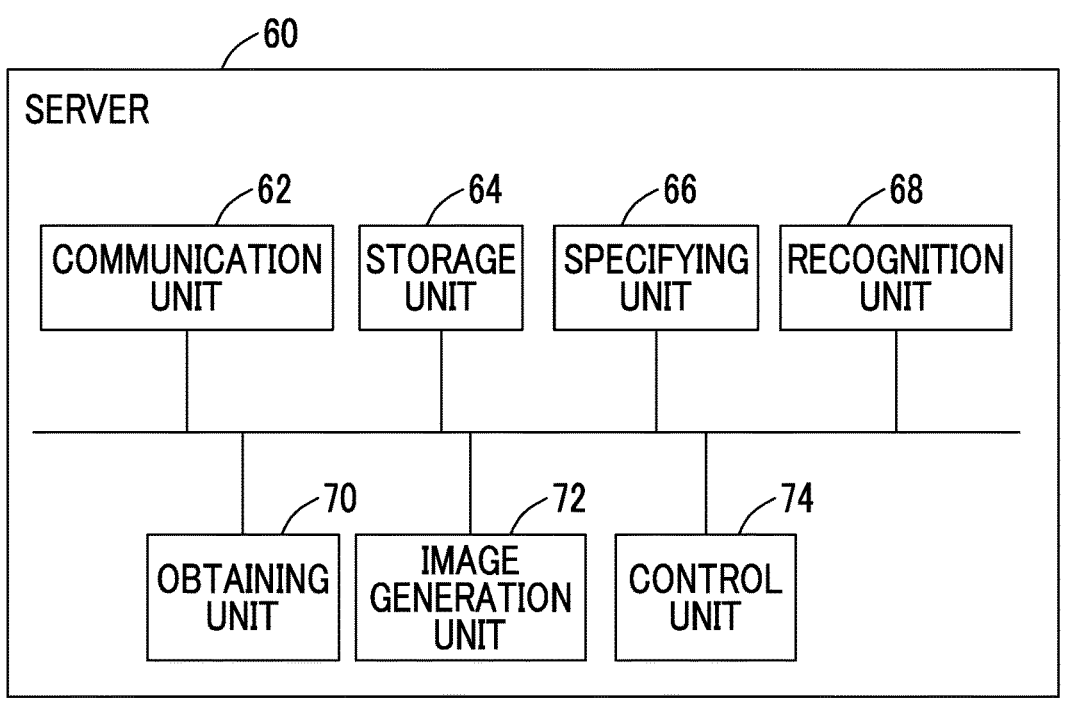
FIG. 21 is a block diagram illustrating a configuration of a server according to Modification Example 7.

Hereinafter, a configuration of the server 60 will be described in detail with reference to FIG. 21. FIG. 21 illustrates one example of the configuration of the server 60.

A communication unit 62 is a communication interface and has a function of transmitting information to other apparatuses and a function of receiving information from other apparatuses. The communication unit 62 may have either a wireless communication function or a wired communication function.

A storage unit 64 is one or plural storage areas storing information. For example, each storage area is composed of one or plural storage devices (for example, physical drives such as a hard disk drive and a memory) disposed in the server 60.

A specifying unit 66 is configured to specify the target object 12 of the target for obtaining the target object information in the same manner as the specifying unit 24 disposed in the terminal device 10. The specifying unit 66 may specify the target object 12 recognized by a recognition unit 68, described below, as the target object 12 of the target for obtaining the target object information or may specify the target object 12 designated by the user using the terminal device 10 as the target object 12 of the target for obtaining the target object information.

The recognition unit 68 is configured to receive the captured image data transmitted to the server 60 from the terminal device 10 and recognize the target object 12 represented in the captured image data in the same manner as the recognition unit 26 disposed in the terminal device 10. The recognition unit 68 recognizes the target object 12 using the captured image data currently being captured by the capturing unit 22.

An obtaining unit 70 is configured to obtain the target object information of the target object 12 specified by the specifying unit 66 in the same manner as the obtaining unit 28 disposed in the terminal device 10. For example, the obtaining unit 70 may obtain the target object information from the information management database 14 or the target object 12. In addition, in a case where the target object information is stored in the storage unit 64, the obtaining unit 70 may obtain the target object information from the storage unit 64.

An image generation unit 72 is configured to generate the first image data and the second image data. For example, the image generation unit 72 generates the first image data by adding the additional image data based on the target object information obtained by the obtaining unit 70 to the captured image data transmitted to the server 60 from the terminal device 10. In addition, the image generation unit 72 generates the second image data by adding the additional image data to the alternative image data. For example, the alternative image data is stored in the storage unit 64.

A control unit 74 is configured to control the operation of each unit of the server 60. For example, the control unit 74 controls the communication unit 62 to transmit the first image data or the second image data generated by the image generation unit 72 to the terminal device 10. In addition, the control unit 74 may store the first image data and the second image data in the storage unit 64 in association with the target object information or may store the captured image data in the storage unit 64.

Even in a case where the first image data and the second image data are generated by the server 60, the process of any of the exemplary embodiment and Modification Example 1 to Modification Example 6 is executed. In this case, the first image or the second image is displayed on the display unit of the terminal device 10 by transmitting and receiving information between the terminal device 10 and the server 60.

In addition, the first image data may be generated based on the captured image data transmitted to the server 60 from the terminal device 10 used by a certain user, and the first image based on the first image data may be displayed on the terminal device 10 used by another user by transmitting the first image data to the terminal device 10 used by the other user as the second image data.

For example, a scene in which the user needs to execute a work having three steps in order to resolve the error occurring in the image forming apparatus 12A is considered. In this case, it is assumed that in the terminal device 10 used by a user A, the work of all steps is executed by the user A by displaying the first image in all steps. The first image data displayed in each step is stored in the storage unit 64 of the server 60. Then, in a case where another user B resolves the same error, the first image is displayed on the terminal device 10 used by the user B by transmitting the first image data used by the user A and stored in the storage unit 64 to the terminal device 10 used by the user B. The user B executes the work of each step with reference to the first image. For example, even in a case where the image forming apparatus 12A in which the error occurs is not recognized in the terminal device 10 used by the user B, the first image based on the first image data used by the other user A is displayed on the terminal device 10 used by the user B.

While the processes of the exemplary embodiment and each modification example are illustratively described with the image forming apparatus 12A as one example of the target object 12, the present exemplary embodiment and each modification example may be applied to apparatuses other than the image forming apparatus 12A and target objects other than the apparatus. For example, in a case where a product sold in a store is captured and recognized, the first image related to the product may be displayed. In a case where the product is not recognized, the second image related to the product may be displayed.

For example, the function of each unit of the terminal device 10 and the server 60 is implemented by cooperation between hardware and software. Specifically, the terminal device 10 and the server 60 includes one or plural processors, not illustrated, such as a CPU. The function of each unit of the terminal device 10 and the server 60 is implemented by the one or plural processors reading and executing a program stored in a storage device not illustrated. The program is stored in the storage device through a recording medium such as a CD or a DVD or through a communication path such as a network. As another example, the function of each unit of the terminal device 10 and the server 60 may be implemented by a hardware resource such as an electronic circuit or an application specific integrated circuit (ASIC). A device such as a memory may be used in the implementation. As still another example, the function of each unit of the terminal device 10 and the server 60 may be implemented by a digital signal processor (DSP), a field programmable gate array (FPGA), or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a capturing section;
a recognition section that recognizes that a target object is represented in a captured image captured by the capturing section; and
a control section that
determines whether or not the target object is recognized in the captured image,
displays a first image obtained by adding an image based on target object information related to the target object to the captured image on a display section in a case where the recognition section recognizes the target object in the captured image,
and displays a second image obtained by adding the image based on the target object information to an image representing the target object that is different from the captured image on the display section in a case where the recognition section does not recognize the target object in the captured image.

2. The information processing apparatus according to claim 1,
wherein the control section displays the first image on the display section in a case where the recognition section recognizes the target object in the captured image, and displays the second image on the display section in a case where the recognition section does not recognize the target object in the captured image anymore after the recognition section recognizes the target object in the captured image.

3. The information processing apparatus according to claim 2,
wherein the control section does not display the second image on the display section until a predetermined amount of time elapses from a time at which the first image is displayed on the display section.

4. The information processing apparatus according to claim 2,
wherein in a case where a state where the recognition section does not recognize the target object in the captured image continues for a predetermined amount of time or longer after the recognition section recognizes the target object in the captured image, the control section displays the second image on the display section.

5. The information processing apparatus according to claim 1,
wherein the control section does not display the second image on the display section until a predetermined amount of time elapses from a time at which the first image is displayed on the display section.

6. The information processing apparatus according to claim 1, wherein in a case where the information processing apparatus comes to a standstill in a state where the recognition section does not recognize the target object in the captured image, the control section displays the second image on the display section.

7. The information processing apparatus according to claim 6,
wherein in a case where the information processing apparatus moves, the control section displays the captured image on the display section.

8. The information processing apparatus according to claim 1,
wherein the control section displays the second image on the display section along with the captured image.

9. The information processing apparatus according to claim 1,
wherein the control section further displays an image for switching between a display of the captured image and a display of the second image on the display section.

10. The information processing apparatus according to claim 1,
wherein in a case where the second image is displayed on the display section, the control section further displays information for prompting a user to switch the second image to the first image on the display section.

11. An information processing system comprising:
an information processing apparatus; and
an external apparatus,
wherein the information processing apparatus includes
 a capturing section, and
 a control section that displays an image on a display section,
the external apparatus includes
 a recognition section that recognizes that a target object is represented in a captured image captured by the capturing section, and
 a generation section that generates a first image by adding an image based on target object information related to the target object to the captured image and generates a second image by adding the image based on the target object information to an image representing the target object that is different from the captured image captured by the capturing section, and
the control section
determines whether or not the target object is recognized in the captured image,
displays the first image on the display section in a case where the recognition section recognizes the target object in the captured image,
and displays the second image on the display section in a case where the recognition section does not recognize the target object in the captured image.

12. A non-transitory computer readable medium storing a program causing a computer to function as:
a recognition section that recognizes that a target object is represented in a captured image captured by a capturing section; and
a control section that
determines whether or not the target object is recognized in the captured image,
displays a first image obtained by adding an image based on target object information related to the target object to the captured image on a display section in a case where the recognition section recognizes the target object in the captured image,
and displays a second image obtained by adding the image based on the target object information to an image representing the target object that is different from the captured image on the display section in a case where the recognition section does not recognize the target object in the captured image.

* * * * *